(12) United States Patent
Martin et al.

(10) Patent No.: US 10,587,101 B2
(45) Date of Patent: Mar. 10, 2020

(54) CABLE PROCESSING APPARATUS AND METHOD THEREFORE

(71) Applicant: THE BOEING COMPANY, Chicago, IL (US)

(72) Inventors: Damien O. Martin, Lynnwood, WA (US); Nick S. Evans, Lynnwood, WA (US); Bradley J. Mitchell, Snohomish, WA (US); Eerik J. Helmick, Seattle, WA (US)

(73) Assignee: The Boeing Company, Chicago, IL (US)

(*) Notice: Subject to any disclaimer, the term of this patent is extended or adjusted under 35 U.S.C. 154(b) by 349 days.

(21) Appl. No.: 15/472,452

(22) Filed: Mar. 29, 2017

(65) Prior Publication Data
US 2018/0287353 A1 Oct. 4, 2018

(51) Int. Cl.
H01R 43/00 (2006.01)
H02G 1/12 (2006.01)

(52) U.S. Cl.
CPC .......... H02G 1/1256 (2013.01); H02G 1/127 (2013.01)

(58) Field of Classification Search
CPC .................. H02G 1/1256; H02G 1/127; Y10T 29/49123; Y10T 29/532; Y10T 29/53209
USPC ............................ 29/825, 828, 709, 745, 747
See application file for complete search history.

(56) References Cited

U.S. PATENT DOCUMENTS

| 2,902,797 | A |   | 9/1959  | Carpenter |
|-----------|---|---|---------|-----------|
| 3,095,768 | A |   | 7/1963  | Walstrom  |
| 4,597,176 | A |   | 7/1986  | Shields et al. |
| 4,914,986 | A |   | 4/1990  | Masaki |
| 5,016,398 | A |   | 5/1991  | Fukunaga |
| 5,047,169 | A |   | 9/1991  | Shibata et al. |
| 5,074,169 | A | * | 12/1991 | Matz ...................... H02G 1/127 81/9.51 |
| 5,138,910 | A | * | 8/1992  | Ishikawa .............. H02G 1/1256 29/33 M |

(Continued)

FOREIGN PATENT DOCUMENTS

DE          4027904          3/1992

OTHER PUBLICATIONS

Ideal Industries, Inc. "Ideal Coax Cable Stripper—(Rotary Style Stripper)"; http://www.idealindustries.com/prodDetail.do?prodId=45-552&div=6&I1=bench_machines&I2=45-552.

(Continued)

Primary Examiner — Donghai D Nguyen
(74) Attorney, Agent, or Firm — Perman & Green, LLP

(57) ABSTRACT

A cable processing apparatus including a frame; a cable guide coupled to the frame; a first cable clamp adjacent the cable guide; a second cable clamp adjacent the cable guide where the first cable clamp is disposed between the cable guide and the second cable clamp; and a controller configured to move the second cable clamp to a clamped position such that a cable extending through the cable guide is clamped by the second cable clamp, move the second cable clamp, relative to the cable guide, in a direction extending along the cable such that a first portion of the insulation is removed from the cable at the first score to expose shielding of the cable, and move the second cable clamp, relative to the first cable clamp, in the direction extending along the cable to cut the shielding to expose one or more conductor of the cable.

20 Claims, 19 Drawing Sheets

(56) References Cited

U.S. PATENT DOCUMENTS 5,272,941 A * 12/1993 English ............... H02G 1/1256
                                                    81/9.51
5,664,324 A    9/1997 Hoffa et al.
5,819,602 A   10/1998 Brask et al.
6,546,617 B1   4/2003 Hayashi et al.

OTHER PUBLICATIONS

The Schleuniger Group, "CoaxStrip 5200—(Rotary Style Stripper)"; http://www.schleuniger.com/products/picoaxstrip-5200/.
The Eraser Company Inc. "D1 Wheel Stripper"; https://www.eraser.com/products/wire-cable-strippers-product/wheel-strippers/d1-wheel-stripper . . . Printed Apr. 25, 2017.

* cited by examiner

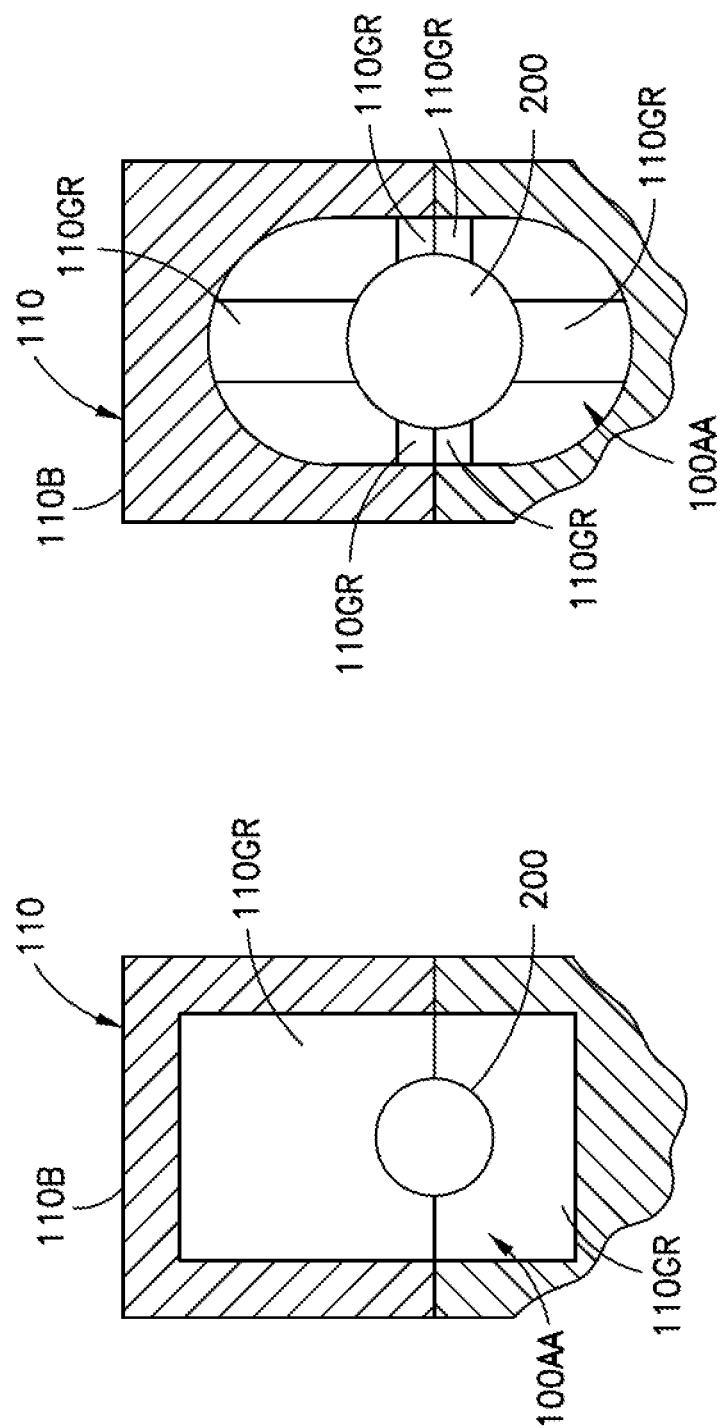

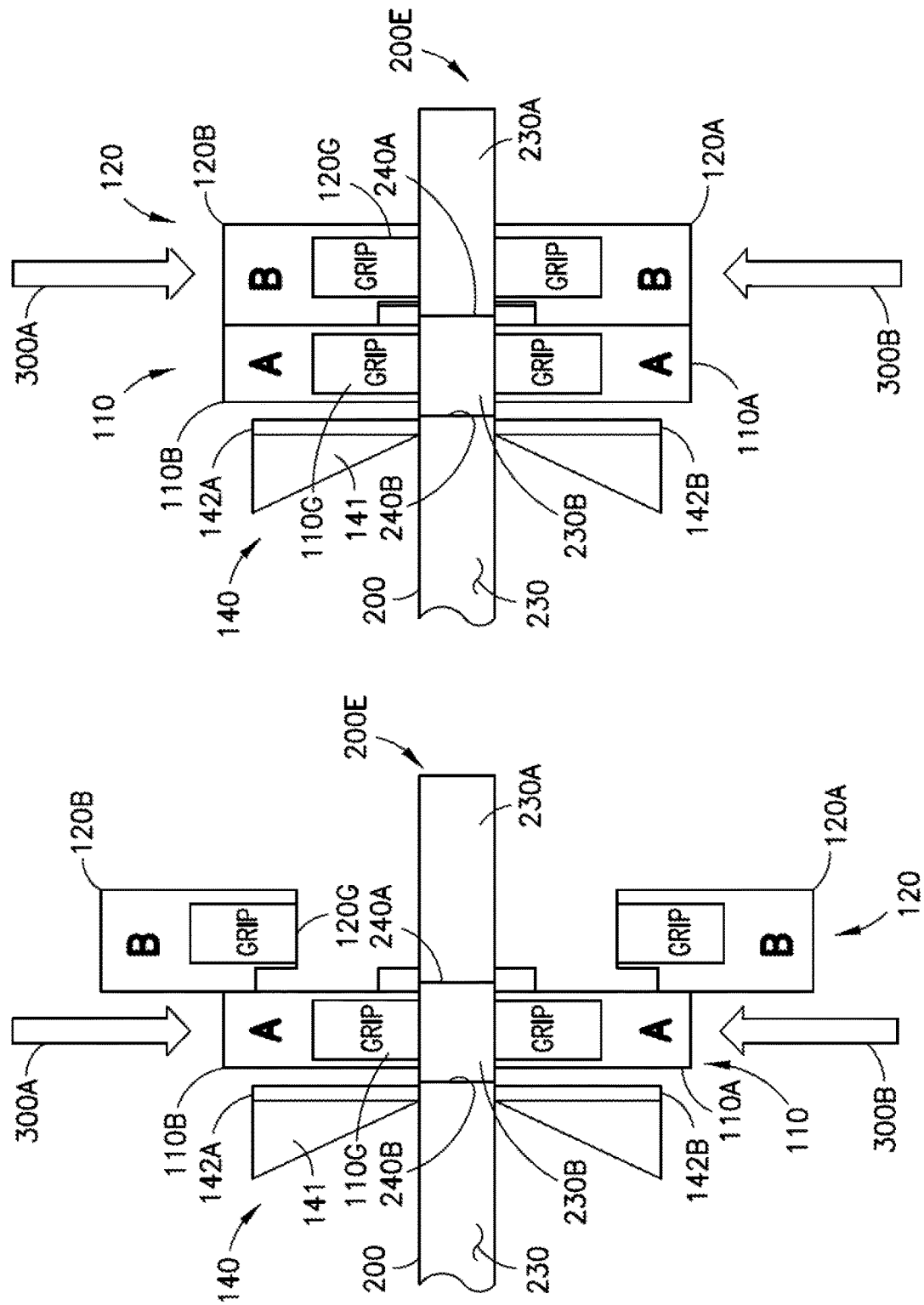

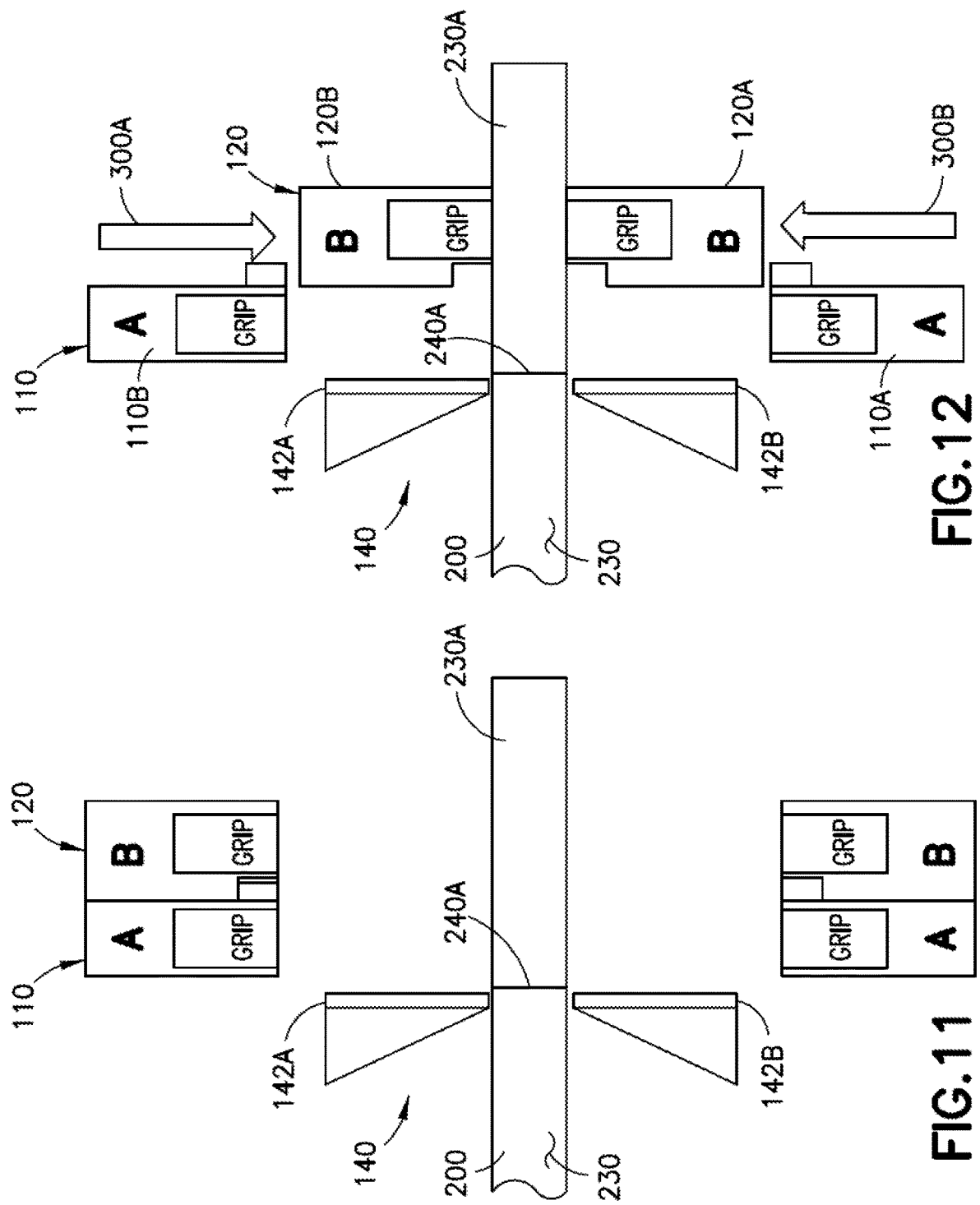

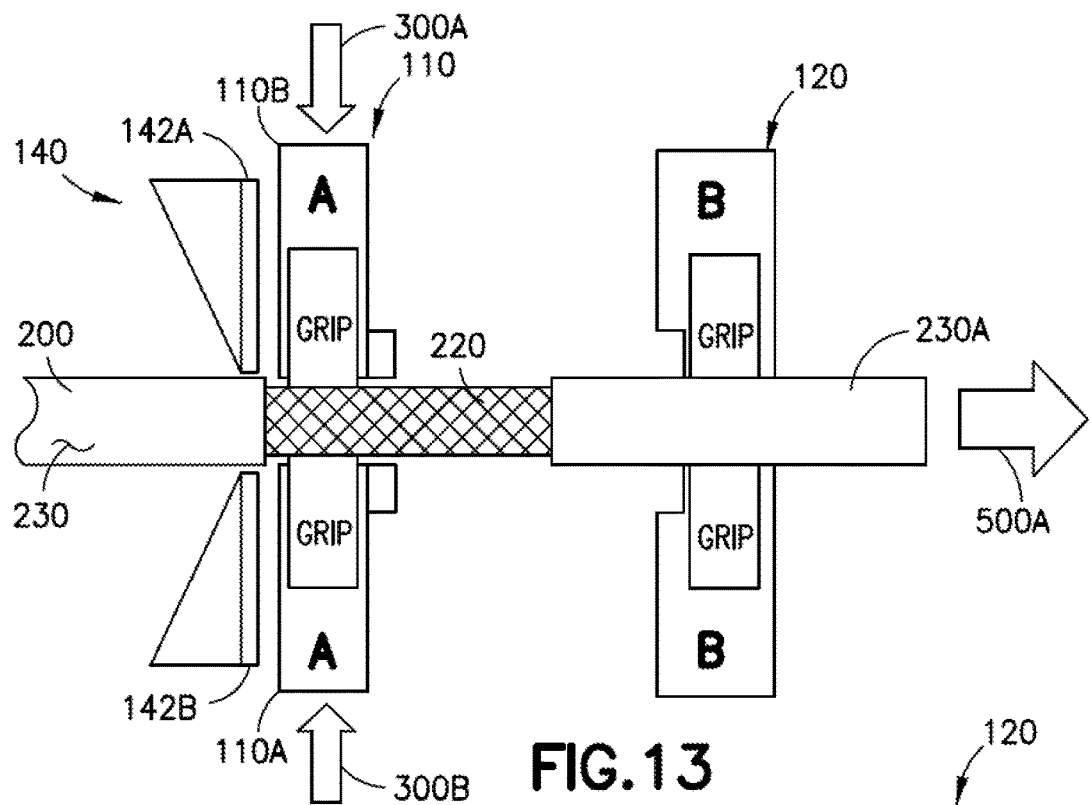
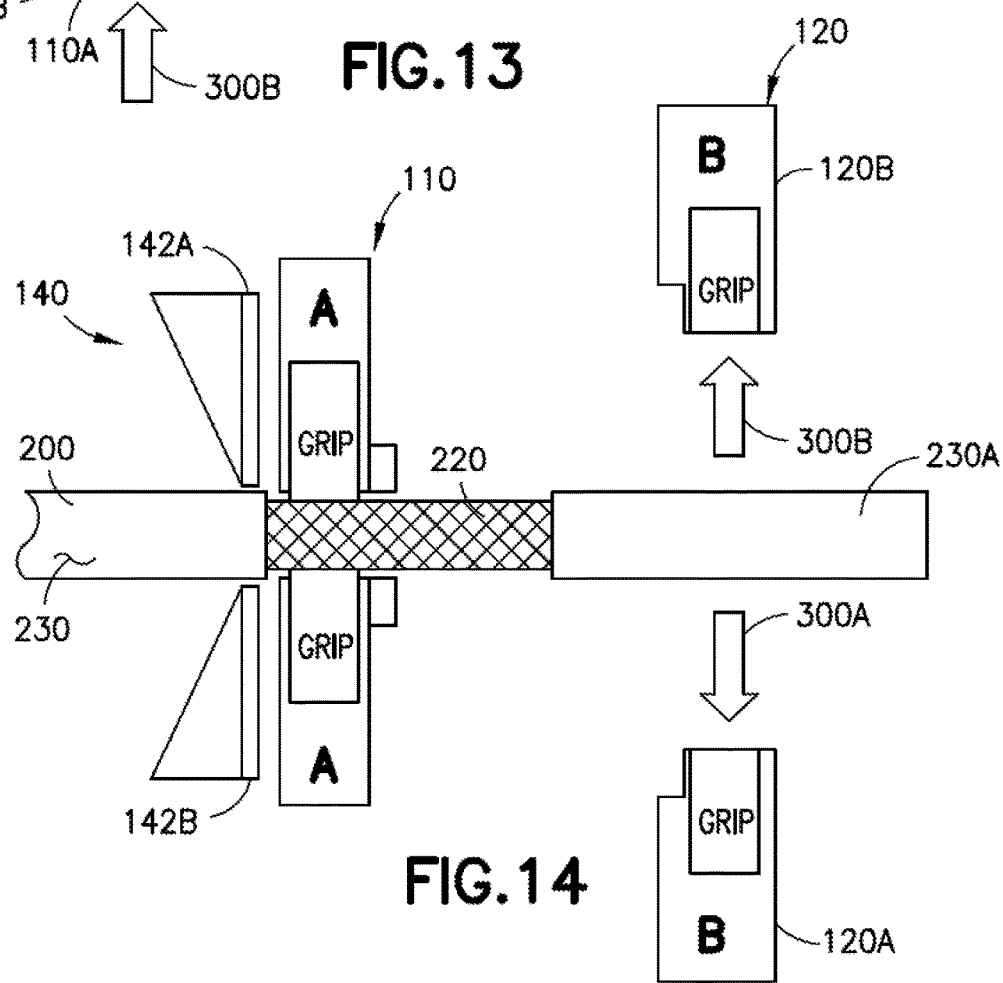

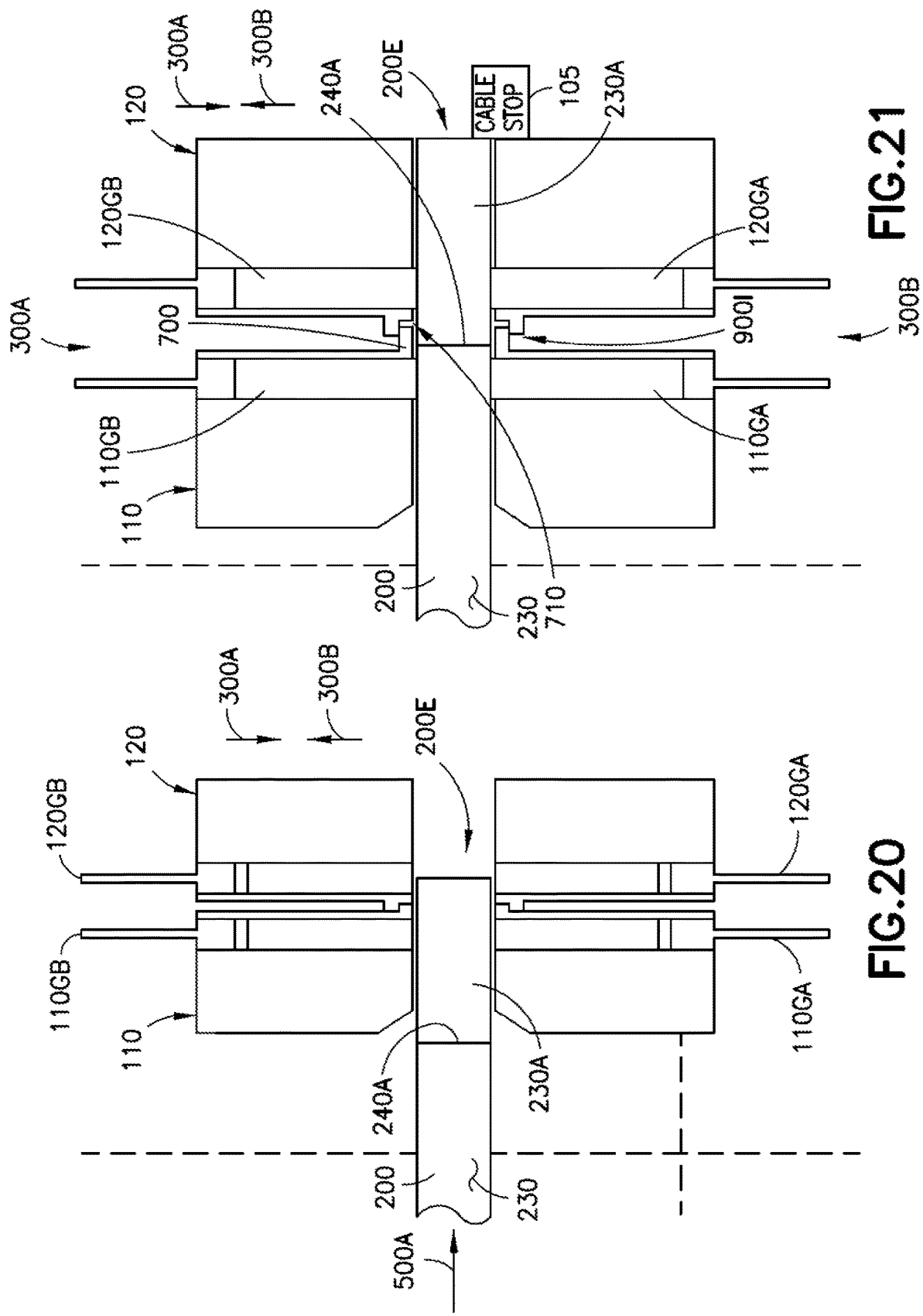

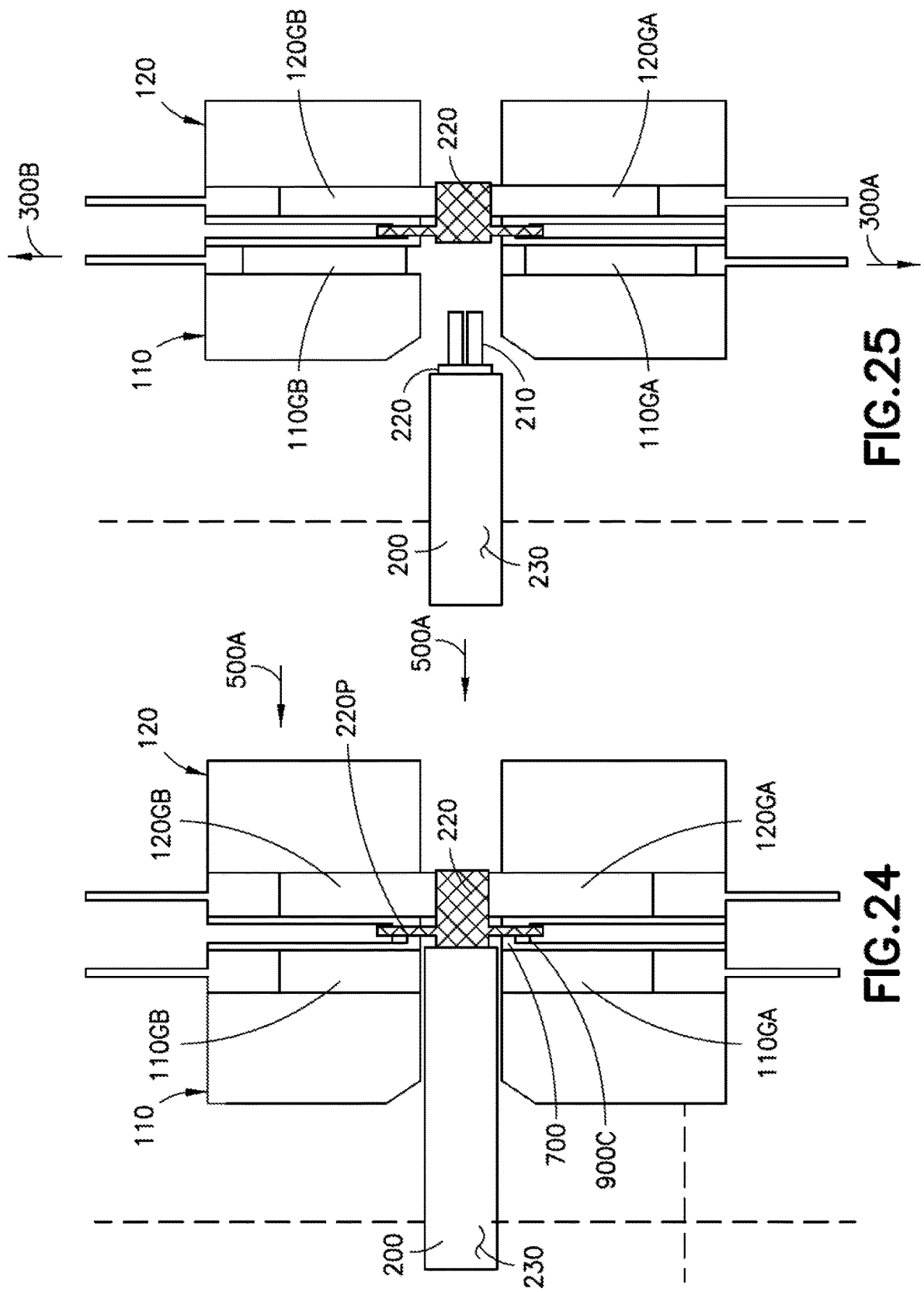

CABLE PROCESSING APPARATUS AND METHOD THEREFORE

BACKGROUND

1. Field

The exemplary embodiments generally relate to cable processing and in particular to automated cable processing apparatus and methods.

2. Brief Description of Related Developments

A wiring harness includes a bundle of cables, and each cable can include multiple wires (each having a conductor) therein. At least some known cables include one or more wires surrounded by shielding and a wire jacket or insulation. While assembling a wiring harness, a portion of the insulation is removed, and a portion of the exposed shielding is removed to enable a connector to be installed on the exposed conductor.

Generally, the insulation and shielding is removed from the cable manually. However, manual insulation and cable removal takes a large amount of time and may produce inconsistent results (e.g. frayed shielding and/or torn insulation). There are automated machines that remove the insulation and cut the shielding however, these automated machines also have large cycle times. Generally, there are no conventional solutions that perform both the removal of cable insulation and cutting of the shielding as a common function (e.g. with one touching of the cable or in a single step of processing). For example, conventional automated machines may remove the insulation and cut the shielding however, these operations are performed in different steps such that the wire must be removed from the insulation removal tool and inserted into the shielding cutting tool which, again, increases processing times of the cable.

SUMMARY

The following is a non-exhaustive list of examples, which may or may not be claimed, of the subject matter according to the present disclosure.

One example of the subject matter according to the present disclosure relates to a cable processing apparatus that includes a frame; a cable guide coupled to the frame; a first cable clamp coupled to the frame adjacent the cable guide; a second cable clamp coupled to the frame adjacent the cable guide such that the first cable clamp is disposed between the cable guide and the second cable clamp; and a controller coupled to the first cable clamp and the second cable clamp, the controller being configured to move the second cable clamp to a clamped position such that a cable extending through the cable guide into the frame is clamped by the second cable clamp, where a first score in an insulation of the cable is disposed between the cable guide and the second cable clamp, move the second cable clamp, relative to the cable guide, in a direction extending along the cable such that a first portion of the insulation clamped by the second cable clamp is removed from the cable at the first score to expose shielding of the cable, and move the second cable clamp, relative to the first cable clamp, in the direction extending along the cable to cut the shielding to expose one or more conductor of the cable.

Another example of the subject matter according to the present disclosure relates to a cable processing apparatus that includes a frame; a cable guide coupled to the frame, the cable guide including gripping members configured to grip a cable extending through the cable guide into the frame; a first cable clamp coupled to the frame adjacent the cable guide; a second cable clamp coupled to the frame adjacent the cable guide such that the first cable clamp is disposed between the cable guide and the second cable clamp; and a controller coupled to the first cable clamp and the second cable clamp, the controller being configured to move the gripping members of the cable guide to grip the cable, move the second cable clamp to a clamped position such that the cable is clamped by the second cable clamp, where a first score in an insulation of the cable is disposed between the cable guide and the second cable clamp, move the second cable clamp, relative to the cable guide, in a direction extending along the cable such that a first portion of the insulation clamped by the second cable clamp is removed from the cable at the first score to expose shielding of the cable, move the second cable clamp, relative to the first cable clamp, in the direction extending along the cable to cut the shielding to expose one or more conductor of the cable, and move the gripping members of the cable guide to release the cable.

Still another example of the subject matter according to the present disclosure relates to a method for processing a cable. The method includes inserting a cable through a cable guide so that the cable extends into a housing formed by a frame, where a first cable clamp and a second cable clamp for disposed within a common chamber of the frame; clamping the cable with the second cable clamp such that a first score on an insulation of the cable is disposed between the cable guide and the second cable clamp; moving the second cable clamp, relative to the cable guide, in a direction extending along the cable to remove a first portion of the insulation clamped by the second cable clamp where the first portion of the insulation is separated from the cable at the first score to expose shielding of the cable; and moving the second cable clamp towards the first cable clamp in the direction extending along the cable to cut the shielding to expose one or more conductor of the cable.

BRIEF DESCRIPTION OF THE DRAWINGS

Figure 1A:
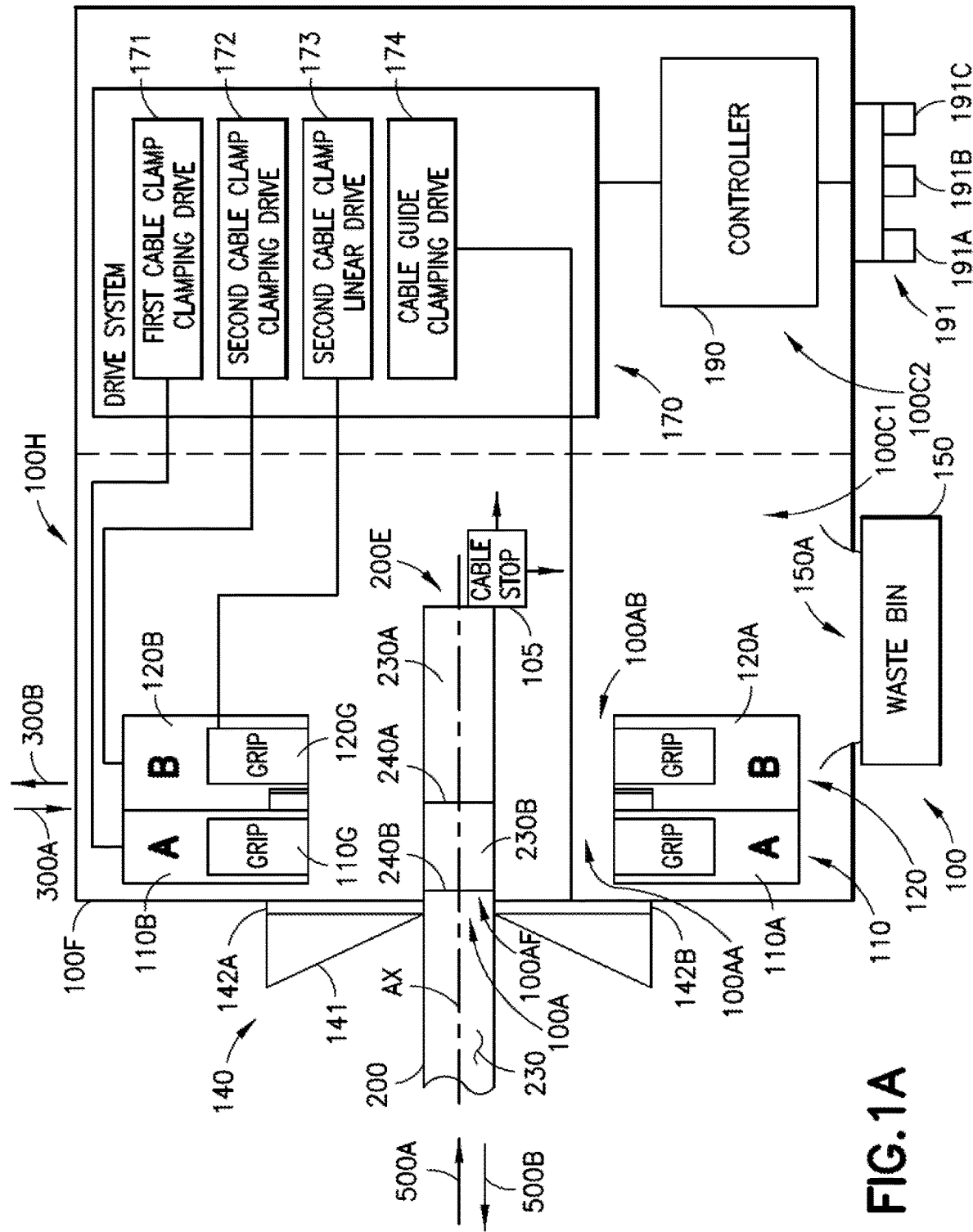
Figure 1B:
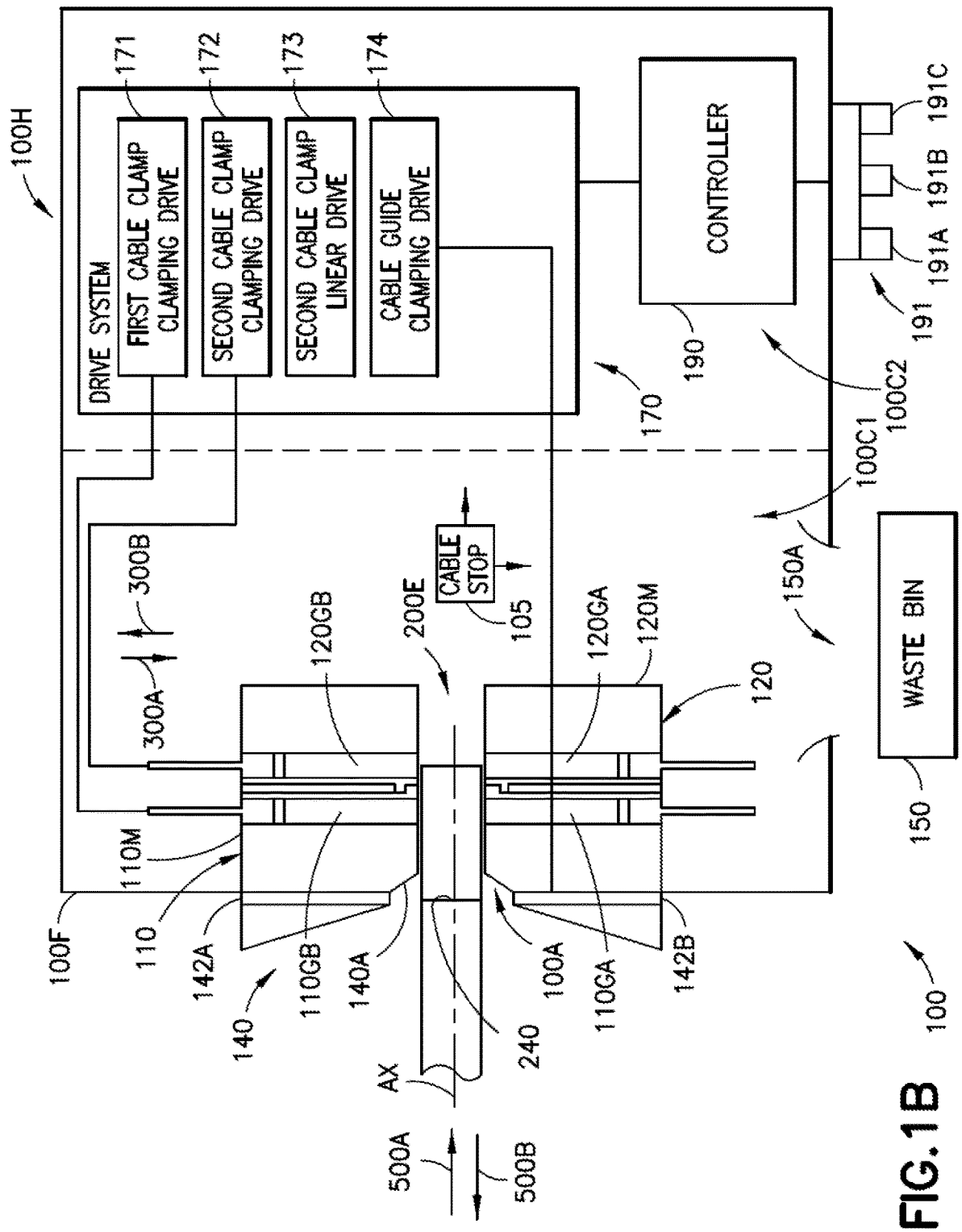
Figure 1C:
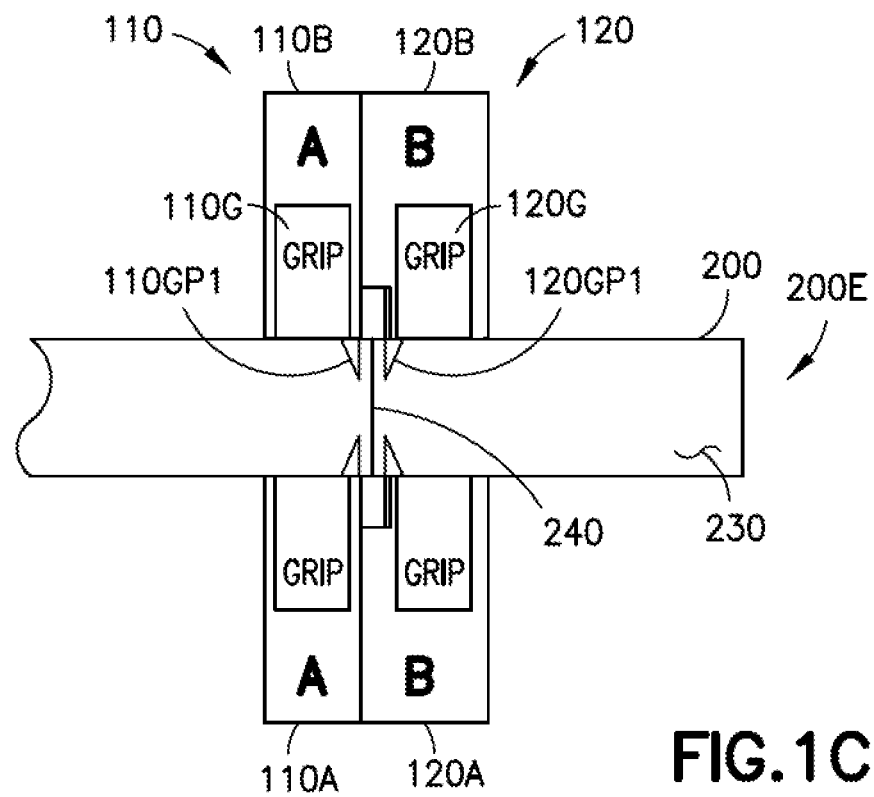
Figure 1D:
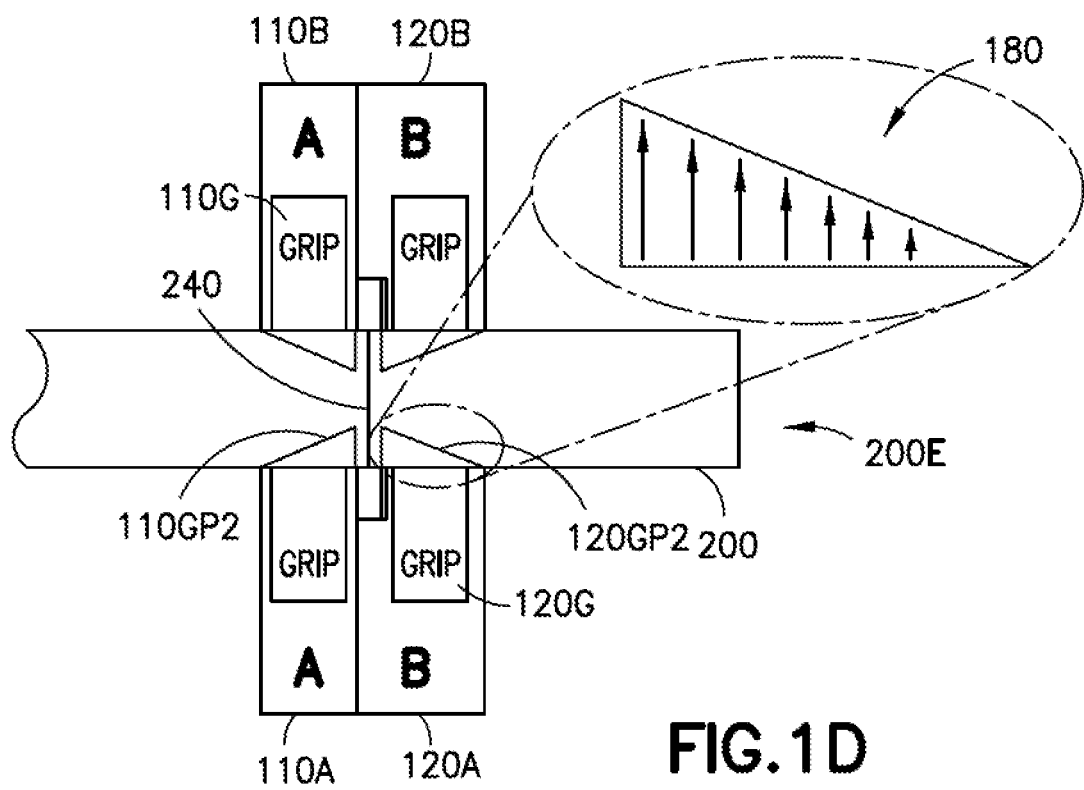
Figure 2A:
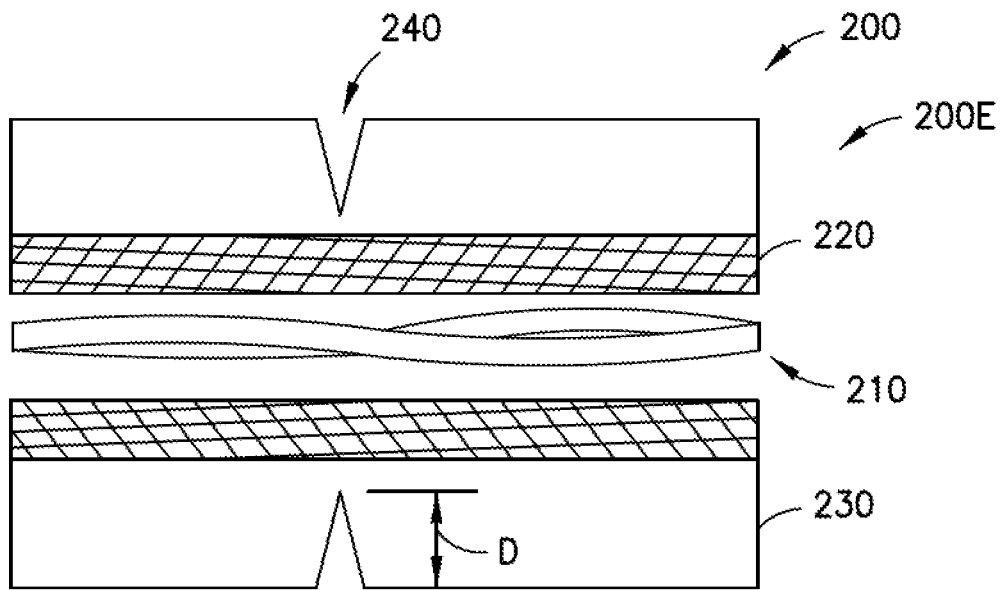
Figure 2B:
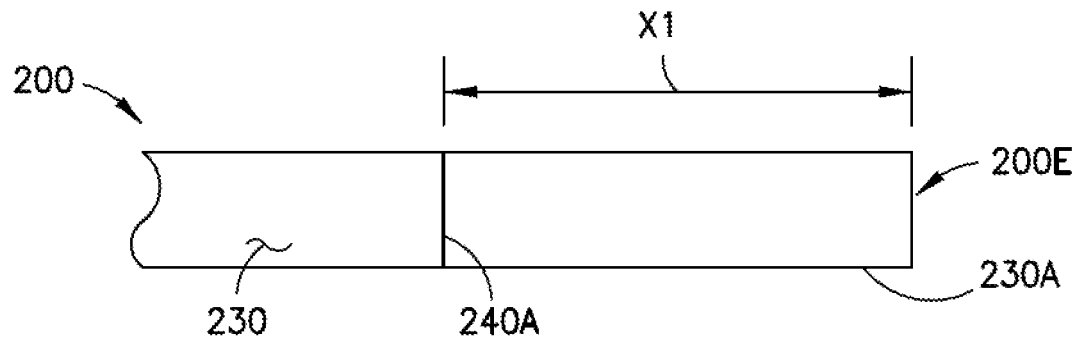
Figure 2C:
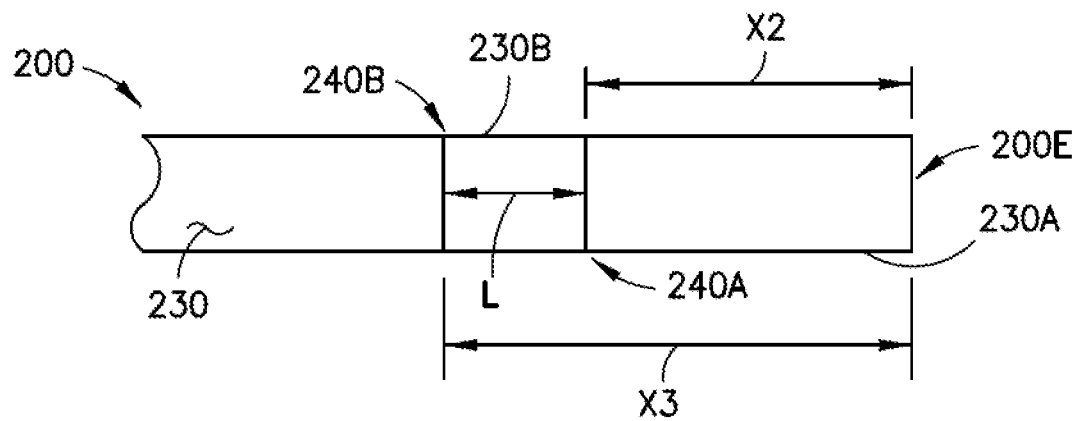
Figure 5:
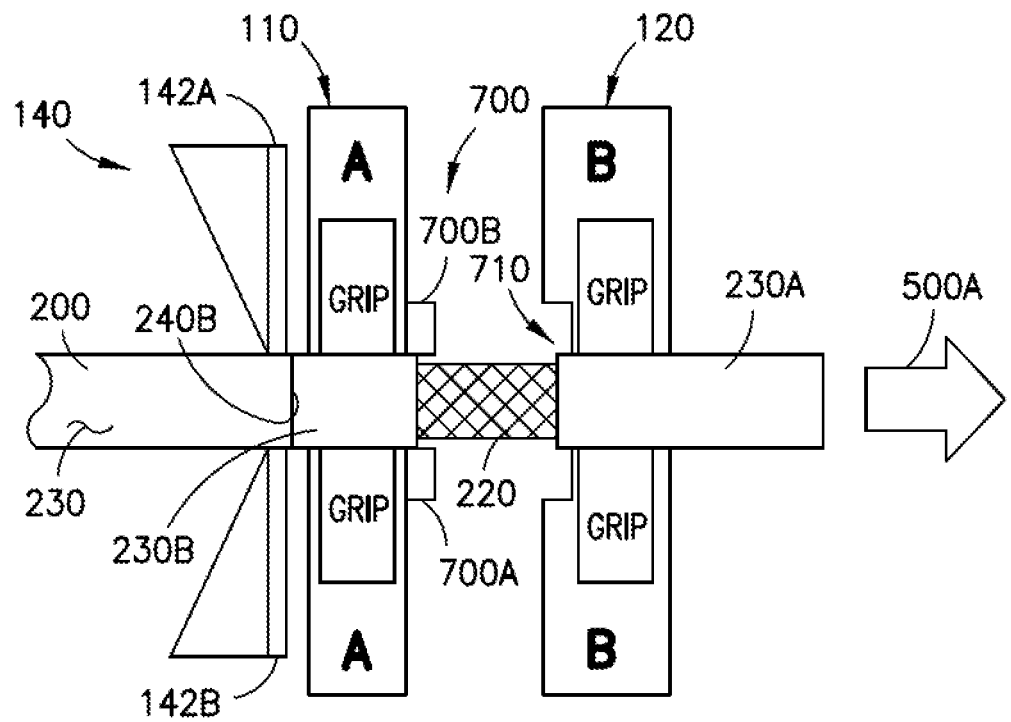
Figure 6:
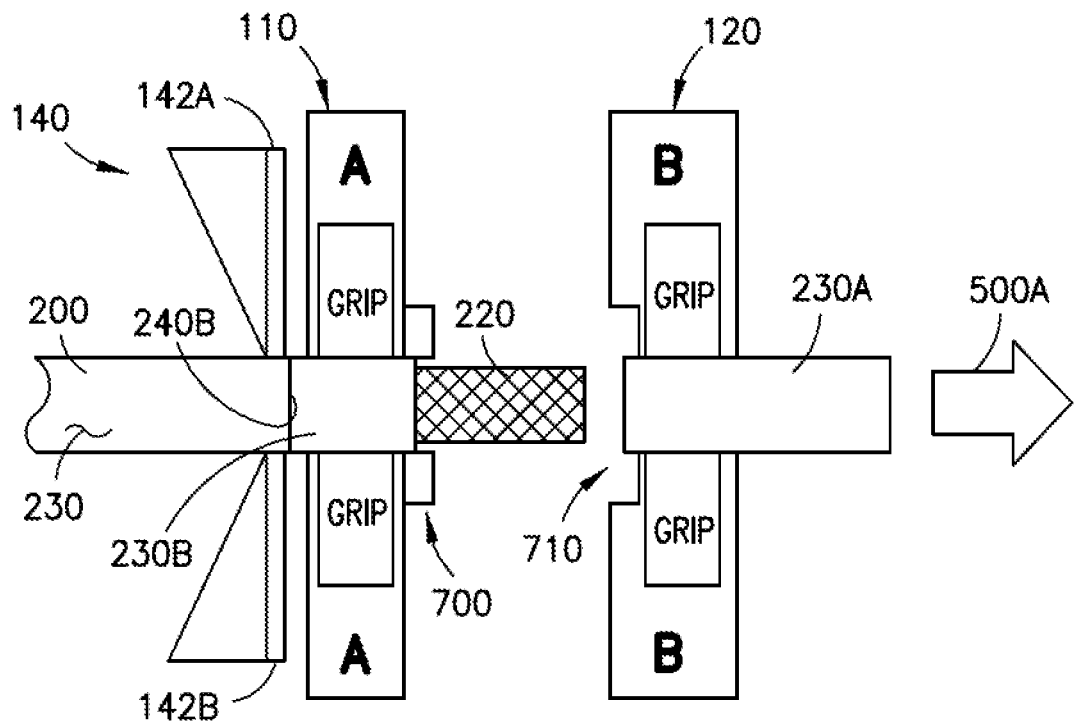
Figure 7:
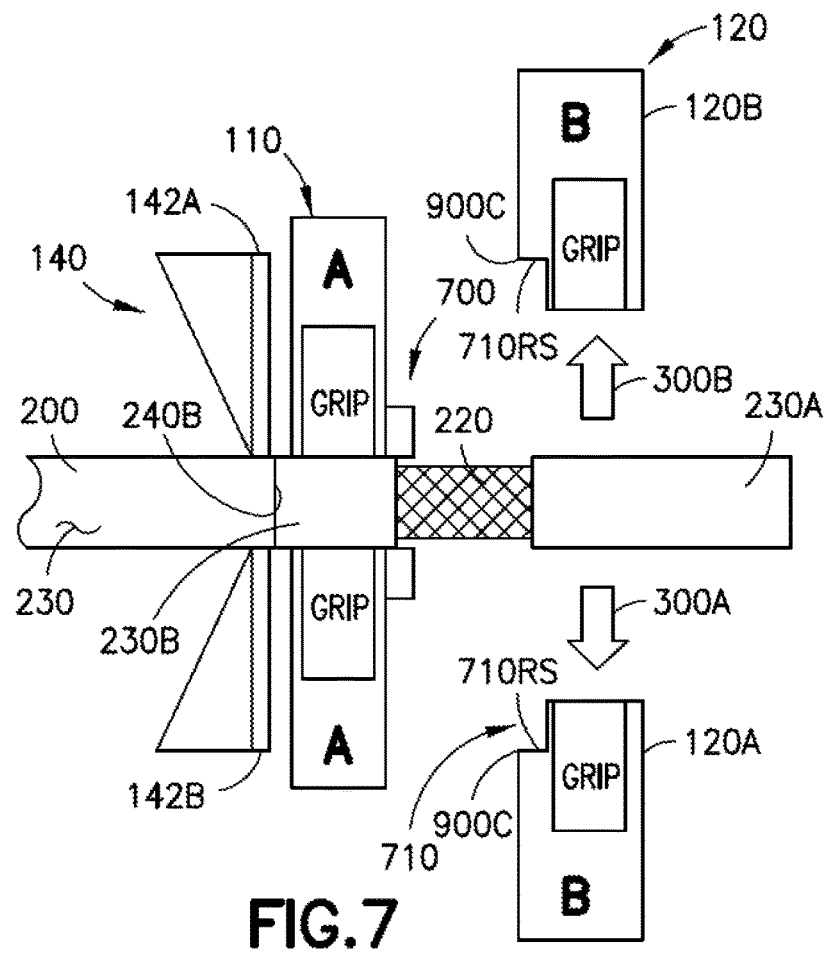
Figure 8:
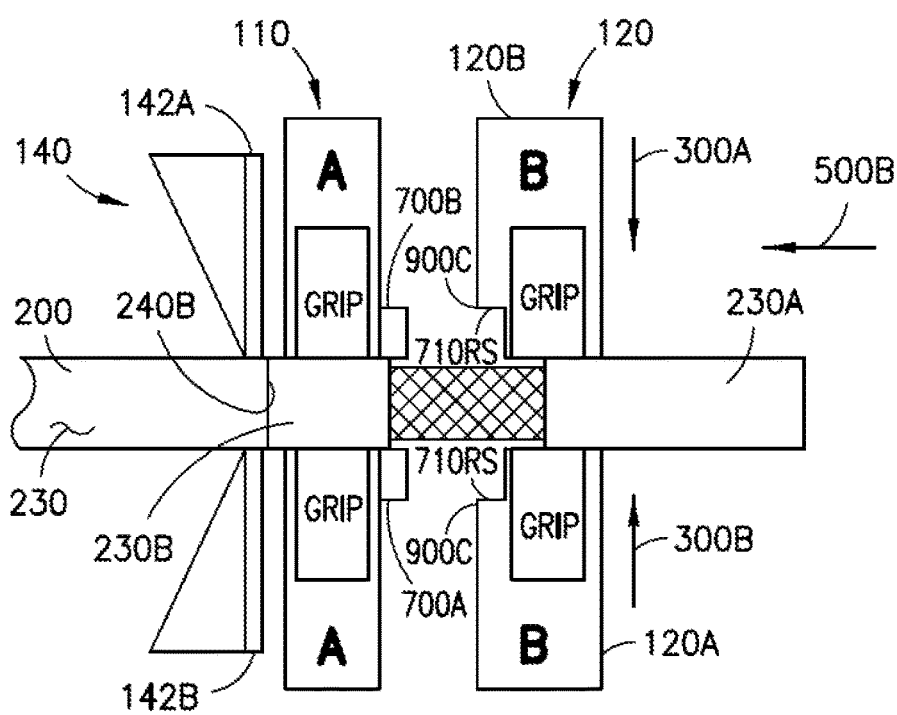
Figure 9A:
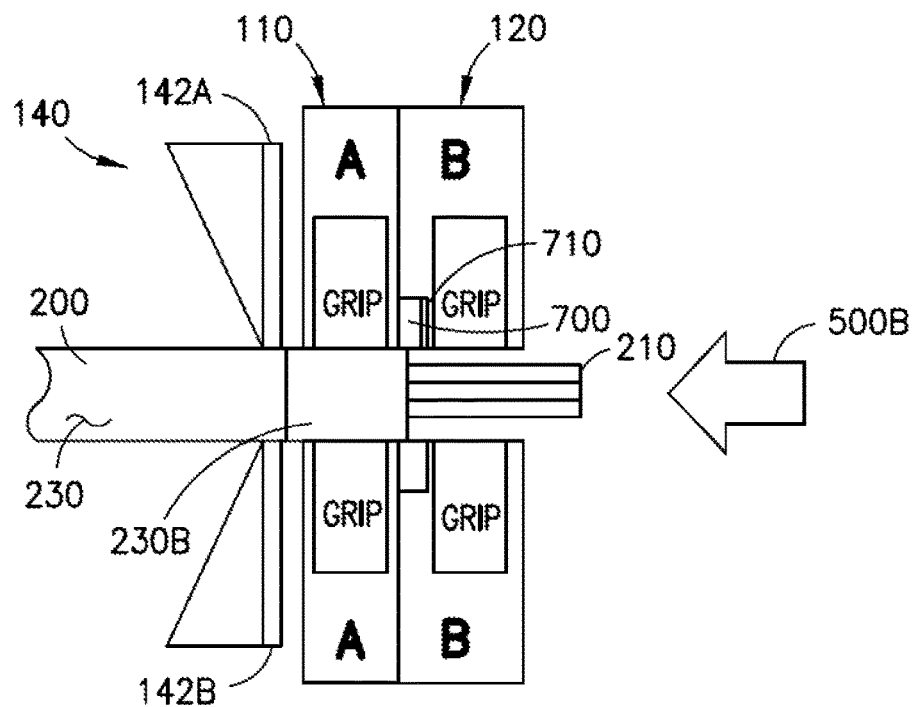
Figure 10:
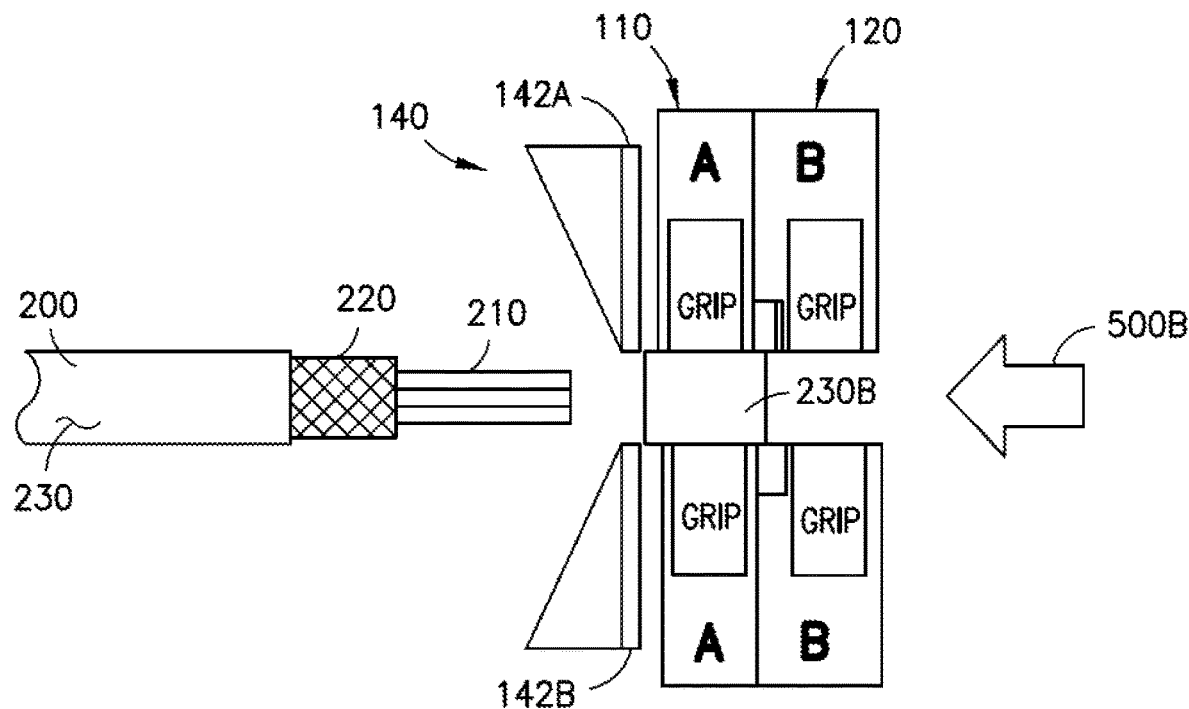
Figure 9B:
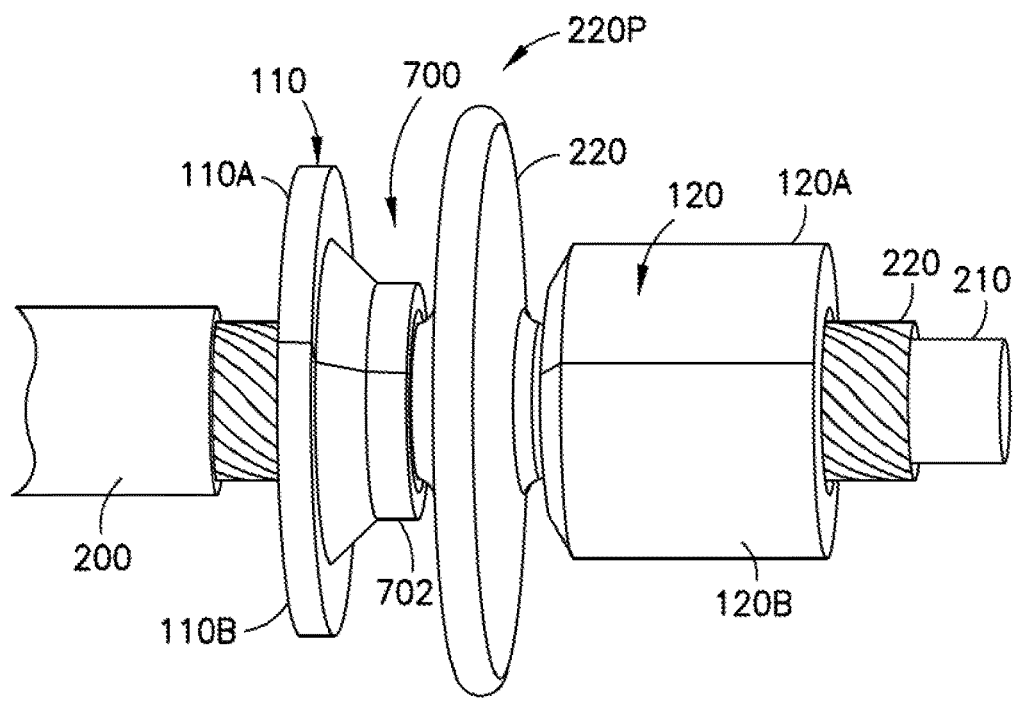
Figure 9C:
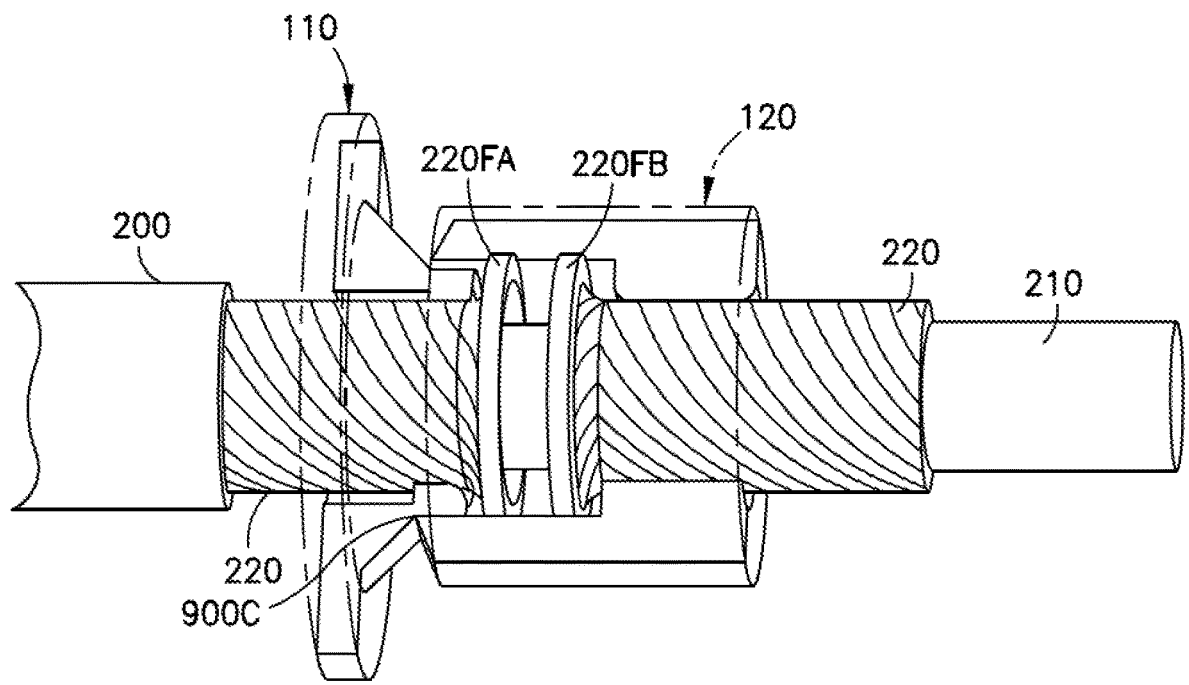
Figure 15:
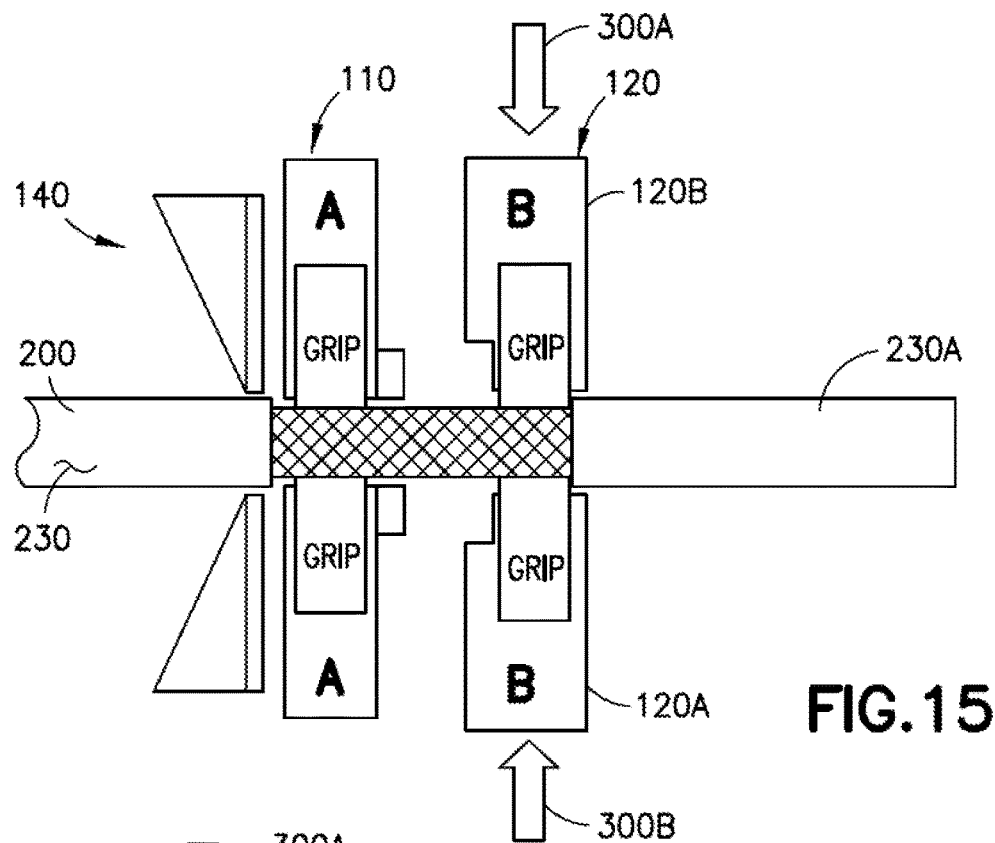
Figure 16:
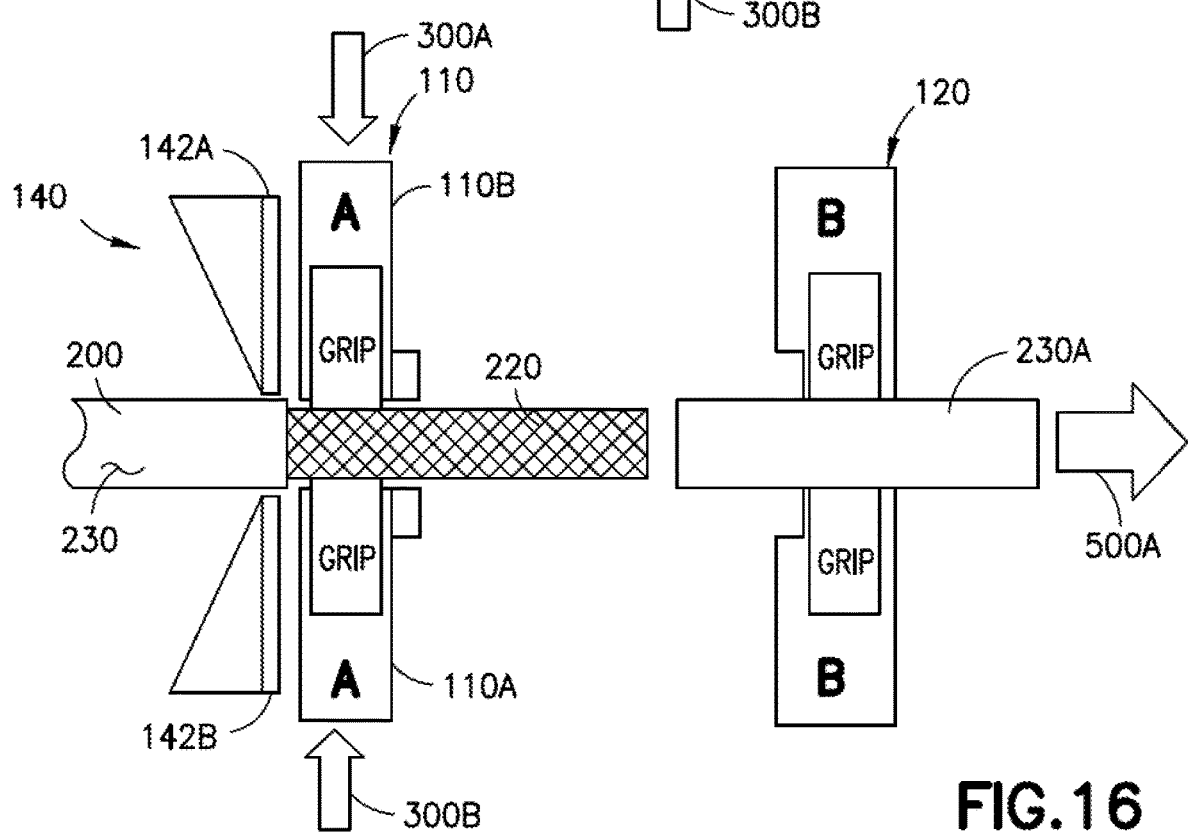
Figure 17:
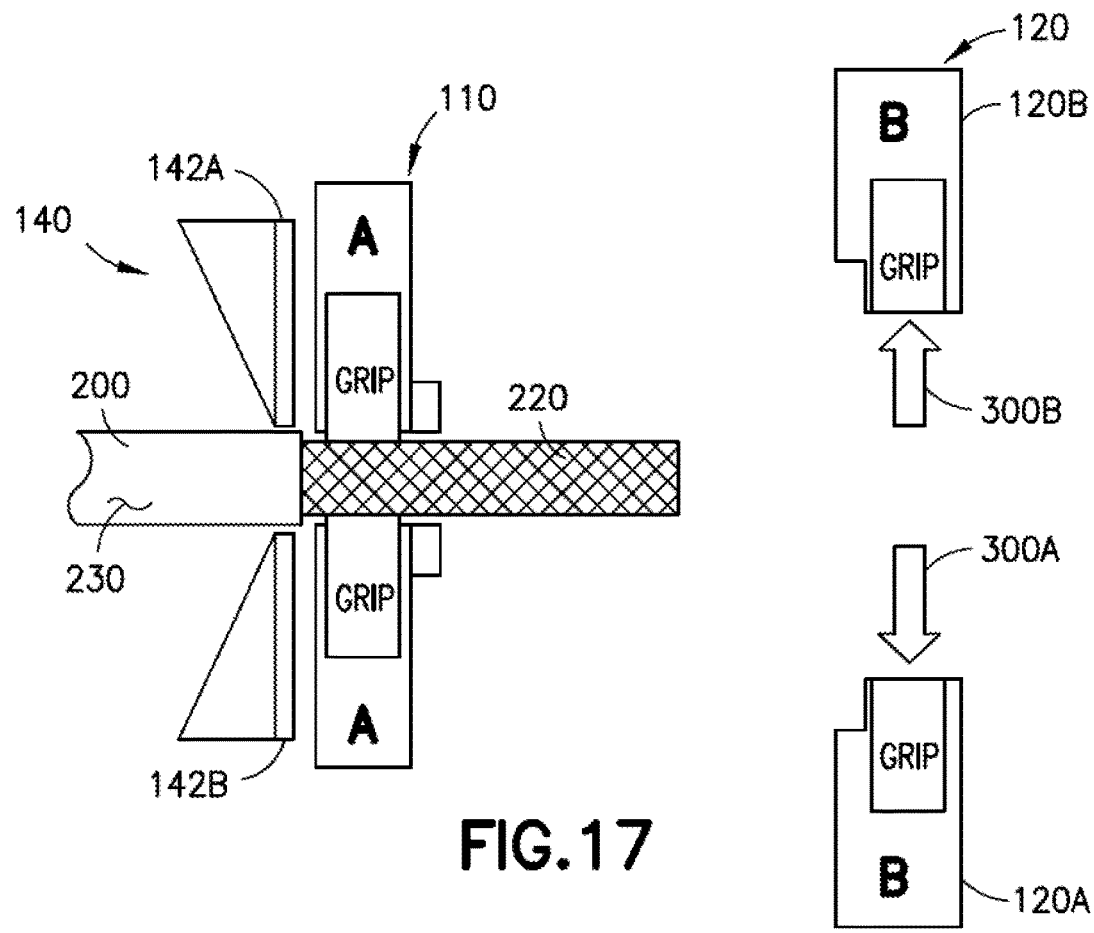
Figure 18:
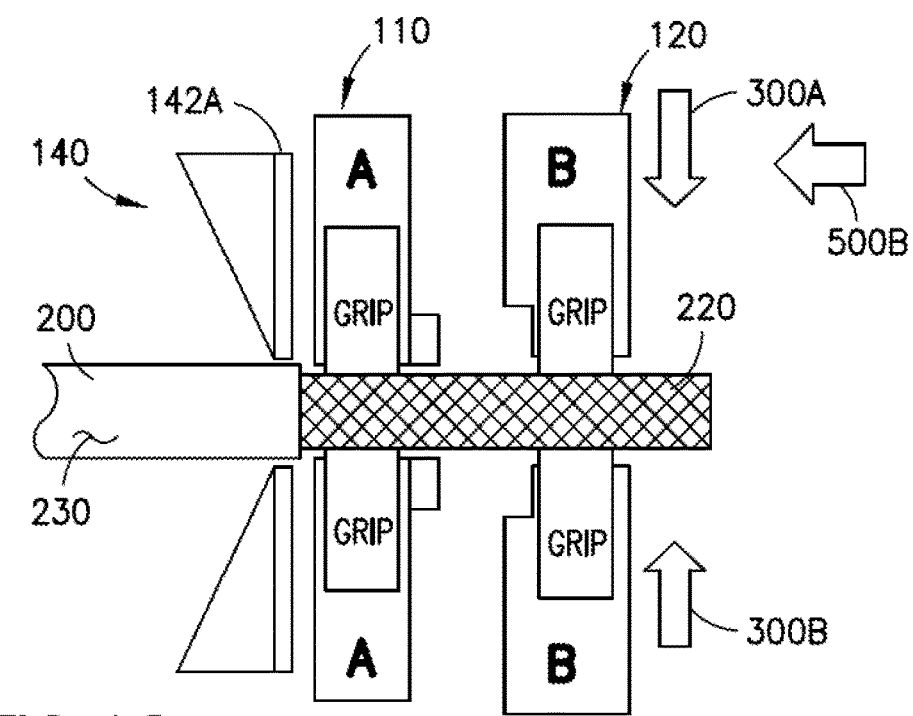
Figure 19:
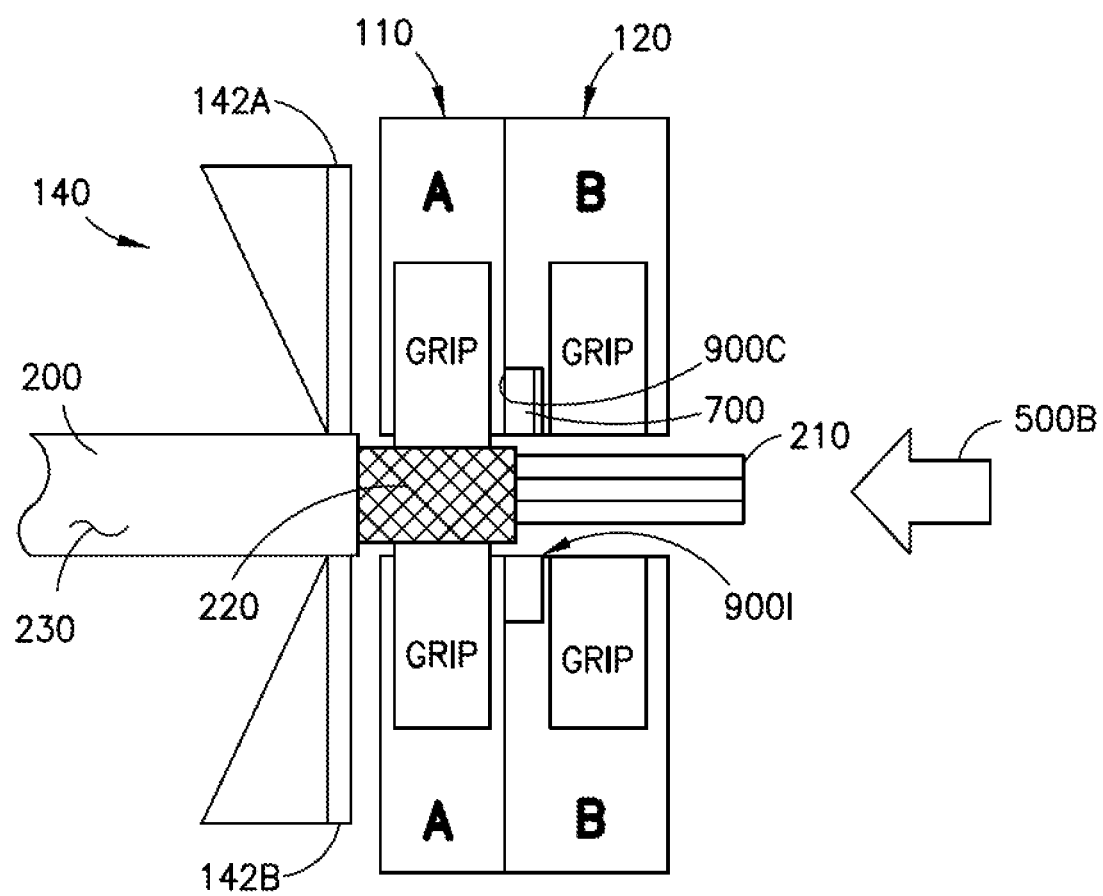
Figure 23:
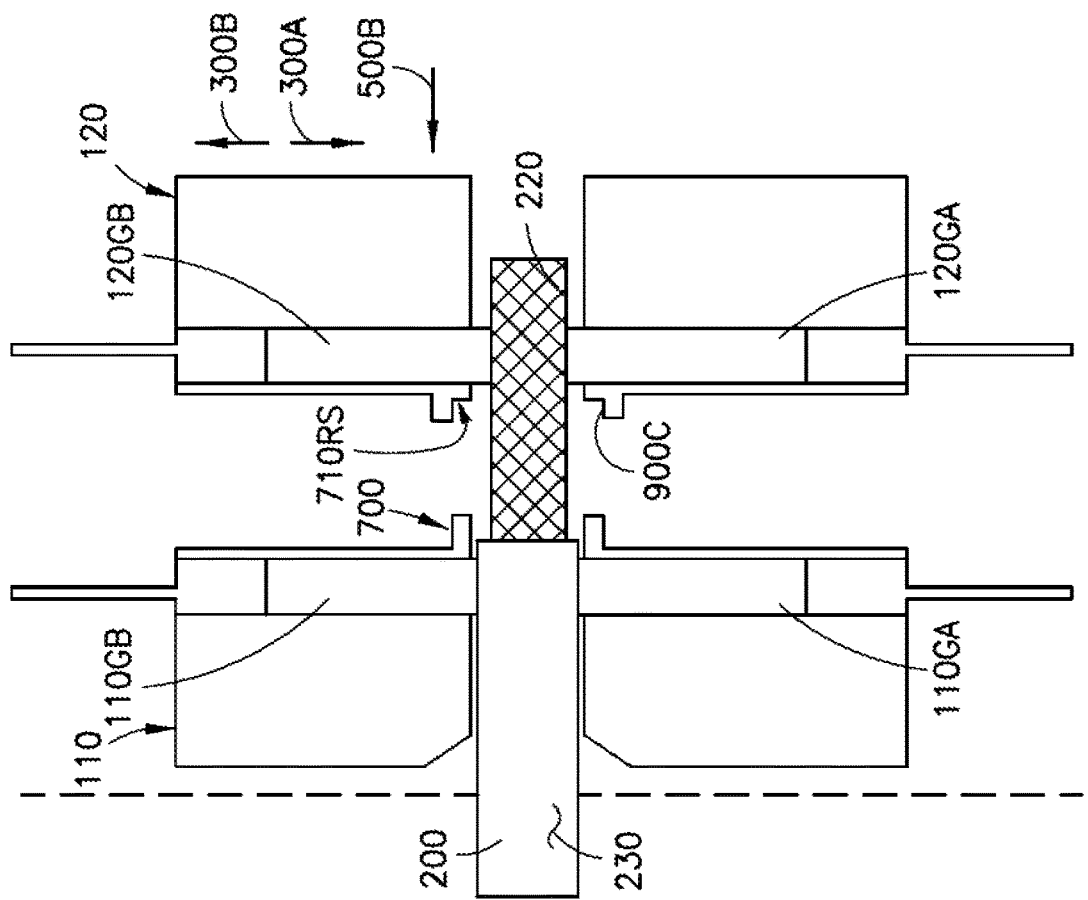
Figure 22:
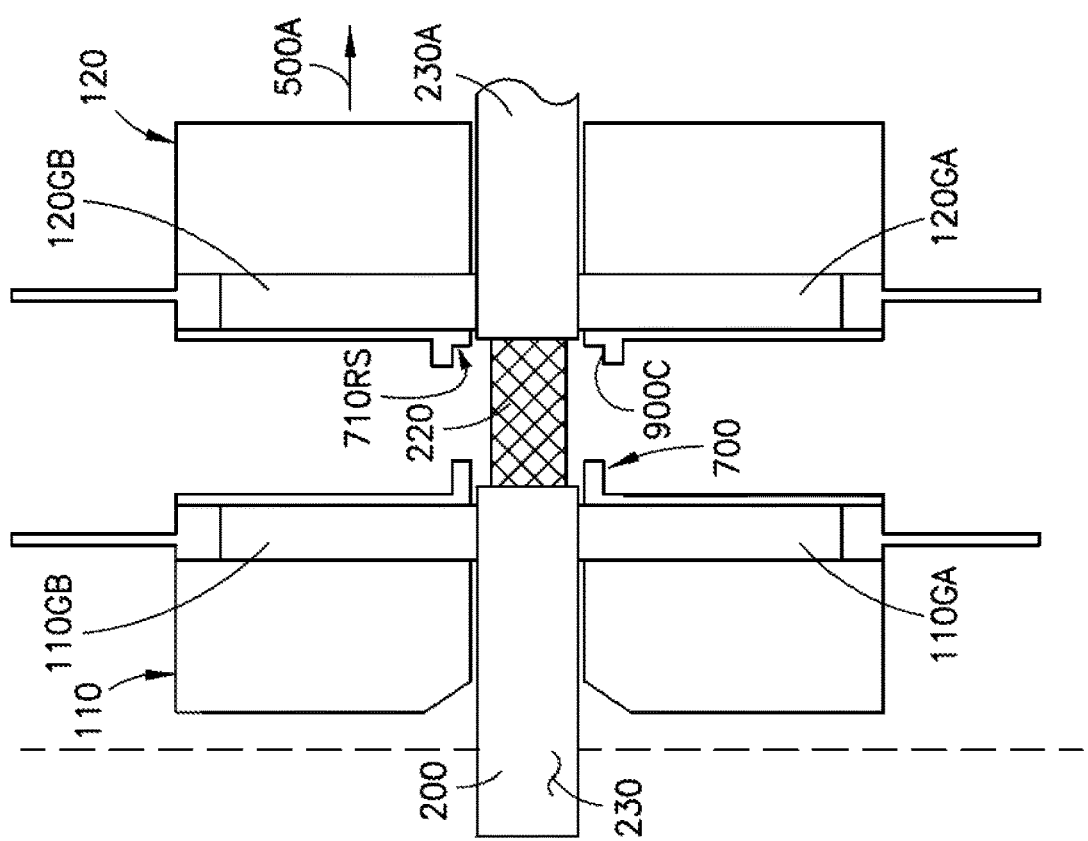
Figure 26:
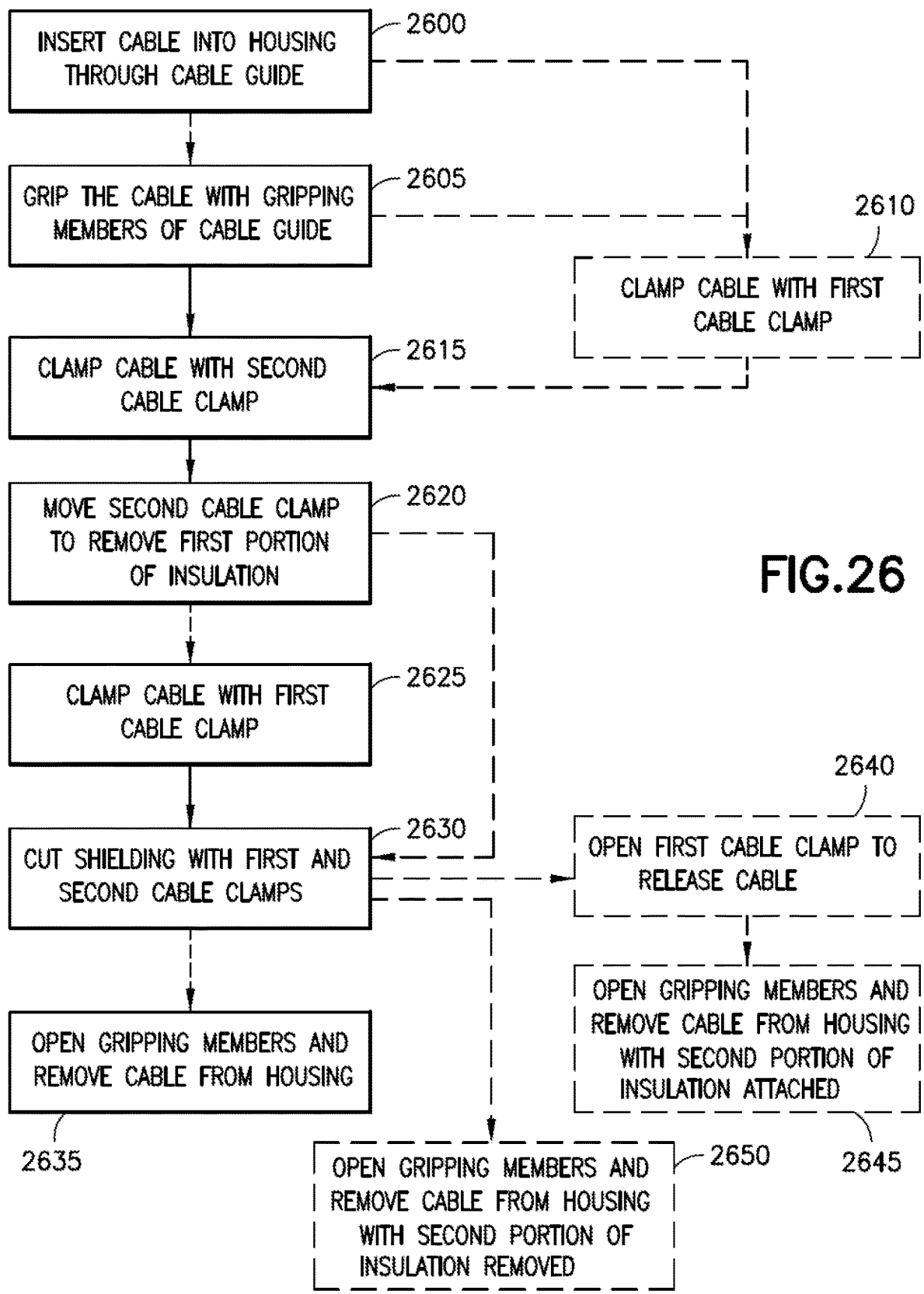

Having thus described examples of the present disclosure in general terms, reference will now be made to the accompanying drawings, which are not necessarily drawn to scale, and wherein like references characters designate the same or similar parts throughout the several views, and wherein:

FIG. 1A is a schematic illustration of a cable processing apparatus in accordance with aspects of the present disclosure;

FIG. 1B is a schematic illustration of a cable processing apparatus in accordance with aspects of the present disclosure;

FIG. 1C is a schematic illustration of a portion of the cable processing apparatus of FIGS. 1A and 1B in accordance with aspects of the present disclosure;

FIG. 1D is a schematic illustration of a portion of the cable processing apparatus of FIGS. 1A and 1B in accordance with aspects of the present disclosure;

FIG. 1E is a schematic illustration of a portion of the cable processing apparatus of FIGS. 1A and 1B in accordance with aspects of the present disclosure;

FIG. 1F is a schematic illustration of a portion of the cable processing apparatus of FIGS. 1A and 1B in accordance with aspects of the present disclosure;

FIG. 2A is a schematic illustration of a cable in accordance with aspects of the present disclosure;

FIG. 2B is a schematic illustration of the cable of FIG. 2A including a single score in an insulation of the cable accordance with aspects of the present disclosure;

FIG. 2C is a schematic illustration of the cable of FIG. 2A including two scores in an insulation of the cable accordance with aspect of the present disclosure;

FIG. 3 is a schematic illustration of a portion of the cable processing apparatus of FIG. 1A in accordance with aspects of the present disclosure;

FIG. 4 is a schematic illustration of a portion of the cable processing apparatus of FIG. 1A in accordance with aspects of the present disclosure;

FIG. 5 is a schematic illustration of a portion of the cable processing apparatus of FIG. 1A in accordance with aspects of the present disclosure;

FIG. 6 is a schematic illustration of a portion of the cable processing apparatus of FIG. 1A in accordance with aspects of the present disclosure;

FIG. 7 is a schematic illustration of a portion of the cable processing apparatus of FIG. 1A in accordance with aspects of the present disclosure:

FIG. 8 is a schematic illustration of a portion of the cable processing apparatus of FIG. 1A in accordance with aspects of the present disclosure;

FIG. 9A is a schematic illustration of a portion of the cable processing apparatus of FIG. 1A in accordance with aspects of the present disclosure;

FIG. 9B is a schematic illustration of a portion of the cable processing apparatus of FIG. 1A in accordance with aspects of the present disclosure;

FIG. 9C is a schematic illustration of a portion of the cable processing apparatus of FIG. 1A in accordance with aspects of the present disclosure;

FIG. 10 is a schematic illustration of a portion of the cable processing apparatus of FIG. 1A in accordance with aspects of the present disclosure;

FIG. 11 is a schematic illustration of a portion of the cable processing apparatus of FIG. 1A in accordance with aspects of the present disclosure;

FIG. 12 is a schematic illustration of a portion of the cable processing apparatus of FIG. 1A in accordance with aspects of the present disclosure;

FIG. 13 is a schematic illustration of a portion of the cable processing apparatus of FIG. 1A in accordance with aspects of the present disclosure;

FIG. 14 is a schematic illustration of a portion of the cable processing apparatus of FIG. 1A in accordance with aspects of the present disclosure;

FIG. 15 is a schematic illustration of a portion of the cable processing apparatus of FIG. 1A in accordance with aspects of the present disclosure;

FIG. 16 is a schematic illustration of a portion of the cable processing apparatus of FIG. 1A in accordance with aspects of the present disclosure;

FIG. 17 is a schematic illustration of a portion of the cable processing apparatus of FIG. 1A in accordance with aspects of the present disclosure;

FIG. 18 is a schematic illustration of a portion of the cable processing apparatus of FIG. 1A in accordance with aspects of the present disclosure;

FIG. 19 is a schematic illustration of a portion of the cable processing apparatus of FIG. 1A in accordance with aspects of the present disclosure;

FIG. 20 is a schematic illustration of a portion of the cable processing apparatus of FIG. 1B in accordance with aspects of the present disclosure;

FIG. 21 is a schematic illustration of a portion of the cable processing apparatus of FIG. 1B in accordance with aspects of the present disclosure;

FIG. 22 is a schematic illustration of a portion of the cable processing apparatus of FIG. 1B in accordance with aspects of the present disclosure:

FIG. 23 is a schematic illustration of a portion of the cable processing apparatus of FIG. 1B in accordance with aspects of the present disclosure:

FIG. 24 is a schematic illustration of a portion of the cable processing apparatus of FIG. 1B in accordance with aspects of the present disclosure;

FIG. 25 is a schematic illustration of a portion of the cable processing apparatus of FIG. 1B in accordance with aspects of the present disclosure; and FIG. 26 is an exemplary flow diagram illustrating an operation of the cable processing apparatus of FIGS. 1A and 1B in accordance with aspects of the present disclosure.

DETAILED DESCRIPTION

The aspects of the present disclosure described herein provide a mechanism that removes the insulation of the cable and cuts the shielding without removing any insulation from or deforming the individual conductors of the cable. The aspects of the present disclosure may also reduce cable processing times as the insulation removal and shielding cutting is performed in a single operation or touching of the cable by an operator (either a manual operator or a robotic operator) within a single apparatus.

Illustrative, non-exhaustive examples, which may or may not be claimed, of the subject matter according to the present disclosure are provided below.

Referring to FIGS. 1A, 1B and 2A-2C an exemplary cable processing apparatus 100 is illustrated incorporating aspects of the present disclosure. In accordance with the present disclosure the cable processing apparatus is configured to process cables such as cable 200 which includes one or more conductors 210, shielding 220 surrounding the one or more conductors 210 and insulation 230 surrounding the shielding 220. Prior to processing of the cable 200 in the cable processing apparatus 100 the cable is scored in one or more locations along the insulation 230 where scoring the cable includes penetrating the insulation to a predetermined depth D in any suitable manner such as by mechanical, optical or thermal means that may include scissors or wire snips, lasers, and thermally heated blades (e.g. hot knife or tweezers). For example, in one aspect the cable 200 may be scored in a single location where a first score 240A is located at a predetermined distance X1 from, for example, an end 200E of the cable 200 such that a slug or a first insulation portion 230A is defined by the first score 240A. In another aspect, the cable 200 may be scored in multiple locations where the first score 240A is located the predetermined distance X2 from the end 200E and a second score 240B is located a predetermined distance X3 from the end 200E, where the distance X2 is smaller than the distance X3 such that two slugs or a first insulation portion 230A and a second insulation portion 230B are defined by the first and second scores 240A, 240B. In one aspect, each score 240, such as the first and second scores 240A, 240B, is a penetration into the insulation 230 that circumscribes the insulation 230 where the penetration extends into the insulation 230 the predetermined distance D such that the penetration does not extend through the insulation 230 into the shielding 220. The score 240 provides for the removal or separation of two portions of the insulation at the score 240 such that when one portion of the insulation is pulled relative to the other portion, the score 240 allows the insulation to tear thereby separating the two portions of the insulation.

In one aspect, the cable processing apparatus 100 includes a frame 100F and a cable guide 140 coupled to the frame 100F. The processing apparatus 100 also includes a first cable clamp 110 coupled to the frame 100F adjacent the cable guide 140 and a second cable clamp 120 coupled to the frame 100F adjacent the cable guide 140 such that the first cable clamp 110 is disposed between the cable guide 140 and the second cable clamp 120. Any suitable drive system 170 is included in the cable processing apparatus 100 and coupled to any suitable controller 190 of the cable processing apparatus 100 for moving one or more of the first cable clamp 110, the second cable clamp 120 and the cable guide 140 in any suitable manner based on command signals from the controller 190 for gripping/clamping (e.g. a closed position) and releasing/unclamping (e.g. an open position) the cable 200.

In one aspect, the cable guide 140 includes an entry funnel 141 and one or more gripping members 142A, 142B. The entry funnel 141 is shaped and sized to guide the cable 200 through a cable passage aperture 100A of the entry funnel 141 into the frame 100F. The entry funnel 141 and its cable passage aperture 100A also guides the cable 200 through a cable passage aperture 100AF of the frame 100F, through a cable passage aperture 100AA of the first cable clamp 110 and through a cable passage aperture 100AB of the second cable clamp 120 where the cable passage apertures 100A, 100AF, 100AA, 100AB are arranged relative to each other so as to have a common axis AX along which the cable 200 extends. The one or more gripping members 142A, 142B of the cable guide 140 may be movably coupled to the entry funnel 141 and/or frame 100F in any suitable manner so as to enable the gripping members 142A. 142B to move between a clamped (e.g. closed) and unclamped (e.g. open) position, where when in the clamped position the cable 200 is held firmly in a fixed, i.e. stationary, position in directions 500A, 500B by the one or more gripping members 142A, 142B. In one aspect, there may be two gripping members 142A, 142B spaced 180° apart relative to a circumference of the cable 200 while in other aspects any suitable number of gripping members may be provided that are spaced around the circumference of the cable 200 in any suitable manner. In one aspect, the one or more gripping members 142A, 142B may be actuated between the clamped and unclamped position in any suitable manner such as by a cable guide clamping drive 174 that includes one or more of pneumatic actuators, hydraulic actuators, electric actuators or any other suitable linear and/or rotary actuators configured to move the one or more gripping members 142A. 142B between the clamped and unclamped positions. In one aspect, the one or more gripping members 142A, 142B includes gripping features substantially similar to gripping features of the first cable clamp 110 and the second cable clamp 120 which will be described below.

In one aspect, as illustrated in FIG. 1A, the first cable clamp 110 comprises a first portion 110A and a second portion 110B that define the cable passage aperture 100AA and are movable relative to each other to grip and release the cable 200. For example, the first portion 110A and the second portion 110B move in directions 300A. 300B toward and away from each other under the influence of a first cable clamp clamping drive 171, of the drive system 170, to grip and release the cable 200. While the first cable clamp 110 is described as having a first portion 110A and a second portion 110B in other aspects, the first cable clamp 110 may have more or less than two portions. In one aspect, the first cable clamp clamping drive 171 may be substantially similar to the cable guide clamping drive 174 described herein. In other aspects, as illustrated in FIG. 1B, the first cable clamp 110 includes a unitary member (i.e. a one piece member) 110M defining the cable passage aperture 100AA through which the cable passes 200, and at least two gripping members 110GA, 110GB movably coupled to the unitary member 110M so as to extend into and retract from the cable passage aperture 100AA to grip and release the cable 200. For example, the at least two gripping members 110GA, 110GB move in directions 300A, 300B under the influence of the first cable clamp clamping drive 171, of the drive system 170, toward and away from each other to grip and release the cable 200.

In one aspect, as illustrated in FIG. 1A, the second cable clamp 120 comprises a first portion 120A and a second portion 120B that define the cable passage aperture 100AB and are movable relative to each other to grip and release the cable 200. For example, the first portion 120A and the second portion 120B move in directions 300A, 300B toward and away from each other under the influence of a second cable clamp clamping drive 172, of the drive system 170, to grip and release the cable 200. While the second cable clamp 120 is described as having a first portion 120A and a second portion 120B in other aspects, the second cable clamp 120 may have more or less than two portions. In one aspect, the second cable clamp clamping drive 172 may be substantially similar to the cable guide clamping drive 174 described herein. In other aspects, as illustrated in FIG. 1B, the second cable clamp 120 includes a unitary member (i.e. a one piece member) 120M defining the cable passage aperture 100AB through which the cable passes 200, and at least two gripping members 120GA, 120GB movably coupled to the unitary member 120M so as to extend into and retract from the cable passage aperture 100AB to grip and release the cable 200. For example, the at least two gripping members 120GA, 120GB move in directions 300A, 300B under the influence of the second cable clamp clamping drive 172, of the drive system 170, toward and away from each other to grip and release the cable 200.

In one aspect, where the at least two gripping members 110GA, 110GB, 120GA, 120GB of the first cable clamp 110 and the second cable clamp 120, respectively, are movable relative to the respective unitary member 110M, 120M, the at least two gripping members 110GA, 110GB, 120GA, 120GB may be spaced in any suitable manner relative to the circumference of the cable.

For example, the at least two gripping members 110GA, 110GB, 120GA, 120GB may be spaced apart from each other in their respective unitary member 110M, 120M by 180° relative to the circumference of the cable 200; while in other aspects, there may be more than two gripping members spaced by any suitable amount relative to each other and the circumference of the cable 200 in a manner similar to that illustrated in FIGS. 1E and 1F with respect to grips 110G, 120G of the of the first portions 110A, 120A and second portions 110B, 120B and/or the gripping members 110GA, 110GB. 120GA, 120GB of the first cable clamp 110 and the second cable clamp 120.

In one aspect, at least the second cable clamp 120 may also be movable in directions 500A, 500B by any suitable second cable clamp linear drive 173 of the drive system 170. In one aspect, the second cable clamp linear drive 171 may be substantially similar to the cable guide clamping drive 174 described herein. As will be described herein, movement of at least the second cable clamp 120 in directions 500A, 500B strips at least the second insulation portion 230B of insulation 230 from the cable 200 and/or cuts shielding 220 of the cable 200 for processing the cable 200 as described herein.

In one aspect, the frame 100F includes a waste aperture 150A through which the stripped portions of insulation 230 (e.g. the first insulation portion 230A and the second insulation portion 230B) pass after being released by one or more of the first cable clamp 110 and the second cable clamp 120. For example, the first insulation portion 230A may be held by the first cable clamp 110 and the second insulation portion 230B may be held by the second cable clamp 120. When the first cable clamp 110 releases the first insulation portion 230A the first insulation portion 230A falls through the waste aperture 150A into a waste bin 150 disposed below the waste aperture 150A. Similarly, when the second cable clamp 120 releases the second insulation portion 230B the second insulation portion 230B falls through the waste aperture 150A into the waste bin 150.

In one aspect, the cable processing apparatus 100 also includes a cable stop 105 that is positioned at any suitable location on the frame 100F so as to stop insertion of the cable 200. For example, the cable stop 105 is positioned so that when the cable 200 is inserted into the frame 100F and is positioned by the cable stop 102, the first score 240A is positioned between the first cable clamp 110 and the second cable clamp 120 and the second score 240B is positioned between the cable guide 140 and the first cable clamp 110. In one aspect, the cable stop 102 may positioned or otherwise be movable in one or more directions in any suitable manner, such by any suitable actuator of the drive system 170 so that the cable stop 105 does not interfere with movement of the second cable clamp 120 in the directions 300A, 300B. In one aspect, the cable stop 105 may be integral (e.g. formed in or coupled) with the second cable clamp 120 in any suitable manner so as to move with the second cable clamp 120 as a unit.

In one aspect, the frame 100F forms a housing 100H having one or more chambers 100C1, 100C2. In one aspect, the drive system 170 and controller 190 may be located in chamber 100C2 while the first cable clamp 110, the second cable clamp 120 and cable stop 105 may be located in chamber 100C1 so that insertion and removal of the cable 200 and/or operation of the first cable clamp 110 and second cable clamp 120 does not interfere with the drive system 170 or controller 190. In other aspects, the controller 190 (which may be located in chamber 100C2) may be isolated from the drive system 170, the first cable clamp 110, the second cable clamp 120 and cable stop 105 (which may be located in chamber 100C1) so that debris from the cable processing does not interfere with the controller 190. In still other aspects the drive system 170, the controller 190, the first cable clamp 110, the second cable clamp 120 and cable stop 105 may be located in a common chamber of the housing 100H.

Referring now to FIGS. 1C-1F the gripping features of the cable guide 140, the first cable clamp 110 and the second cable clamp 120 will be described. While the gripping features are described in FIGS. 1C-1F with respect to the first portion 110A and second portion 110B of the first cable clamp 120 as well as the first portion 120A and second portion 120B of the second cable clamp 120 it should be understood that the one or more gripping members 142A, 142B of the cable guide 140 and the gripping members 110GA, 110GB, 120GA, 120GB of the unitary members 110M, 120M may include one or more similar gripping features. In one aspect, each first portion 110A, 120A and each second portion 110B, 120B includes a grip 110G, 120G that has at least one resilient member 110GR and one or more protrusion 110GP1, 120GP1, 110GP2, 120GP2. In one aspect, the one or more resilient member 110GR comprises any suitable resilient material that is configured to engage the cable 200, wherein the one or more resilient member 110GR deforms around the cable 200 (e.g. conforms to a shape of the cable 200) to grip the cable. In one aspect, where the one or more resilient member 110GR includes more than one resilient member 110GR (as shown in FIG. 1F) the more than one resilient members 110GR may radially extend inward relative to a center of the cable passage aperture 100A, 100AA, 100AB. In one aspect, the resilient member(s) 110GR exert sufficient force on the cable to enable the portions of the insulation 230 and cut the shielding 220 to be removed as described herein, where cutting the shielding includes one or more of severing the shielding, tearing of the shielding such as by local stress concentrations, shearing the shielding or otherwise terminating the geometry of the shielding.

In one aspect, as illustrated in FIG. 1C, the one or more protrusion 110GP1, 120GP1 is shaped and sized (e.g. configured) to concentrate a gripping stress of the respective first cable clamp 110, second cable clamp 120 at any suitable location along the cable 200. For example, the one or more protrusion 110GP1, 120GP1 of each of the first cable clamp 110, second cable clamp 120 is positioned on the respective first cable clamp 110 and second cable clamp 120 adjacent a score 240, such as the first score 240A in the insulation 230 of the cable 200 so that the gripping stress is concentrated adjacent the score 240 such that relative movement of the first cable clamp 110 and the second cable clamp 120 away from each other causes the score 240 to tear and the portion of the insulation 230, such as portion 230B is removed. In one aspect, the one or more protrusions 110GP2, 120GP2 are configured to apply a pressure gradient 180 to the insulation 230 of the cable 200, where the pressure gradient 180 decreases further away from the score 240, such as the first score 240A. For example, the one or more protrusion 110GP2, 120GP2 of each of the first cable clamp 110, second cable clamp 120 is positioned on the respective first cable clamp 110 and second cable clamp 120 adjacent a score 240, such as the first score 240A in the insulation 230 of the cable 200 so that the pressure gradient 180 is greatest adjacent the score 240 such that relative movement of the first cable clamp 110 and the second cable clamp 120 away from each other causes the score 240 to tear and the portion of the insulation 230, such as portion 230B is removed. As descried above, with respect to the resilient members 110G, the one or more protrusion 110GP1, 120GP1, 110GP2, 120GP2 may extend radially inward relative to a center of the cable passage aperture 100A, 100AA, 100AB. In one aspect, the one or more protrusions 110GP1, 120GP1, 110GP2, 120GP2 are configured to penetrate any suitable predetermined distance into the insulation 230 or elastically deform the insulation 230 so that the insulation 230 is gripped by the protrusions 110GP1, 120GP1, 110GP2, 120GP2 for separating the insulation portions 230A, 230B from the cable 200.

Referring to FIGS. 1A, 3-19 and 26, an exemplary operation of the cable processing apparatus 100 will be described. As noted above, the cable processing apparatus 100 includes the controller 190 that controls the operation of the drive system 170. The controller 190 may be any suitable controller such as a programmable logic controller, a series of solenoids, and/or a computer processor including non-transitory computer program code configured to effect operation of the cable processing apparatus 100 as described herein. The controller 190 may include any suitable operator interface 191 that includes any suitable controls 191A, 191B, 191C, each of which may correspond to a particular operation of the cable processing apparatus 100. For example, control 191A may correspond to closing the gripping members 142A, 142B of the cable guide 140, control 191B may correspond to cable preparation in which a single portion of insulation 230, such as the first insulation portion 230A is removed from the cable 200, and control 191C may correspond to cable preparation in which two portions of insulation 230, such as the first insulation portion 230A and the second insulation portion 230B are removed from the cable 200. In other aspects, the controls 191A-191C may correspond to any suitable portions of the cable preparation process (e.g. insulation removal and/or shield cutting) performed by the cable processing apparatus 100 so that some or all of the processing operations described herein are performed.

In one aspect, the cable, which includes one or more scores 240 is inserted into the housing 100H formed by the frame 100F through the cable guide 140 (FIG. 26, Block 2600) so that the end 200E of the cable 200 adjacent the one or more score 240 is inserted into the housing 100H first. As described above, the cable 200 may be inserted into the housing 100H, noting that the first cable clamp 110 and the second cable clamp 120 are in an open or released position and disposed adjacent one another during cable 200 insertion, until the end 200E of the cable 200 engages the cable stop 105 for locating the score 240 relative to the first cable clamp 110 and the second cable clamp 120. The cable 200 is gripped by the one or more gripping members 142A, 142B of the cable guide 140 (FIG. 26, Block 2605) so that the cable 200 is held in a fixed position relative to the frame 100F during the cable processing operations performed by the cable processing apparatus 100. For example, the controller 190 sends commands to the cable guide clamping drive 174 so that the one or more gripping members 142A, 142B move in directions 300A, 300B to grip the insulation 230 of the cable 200.

In one aspect, as illustrated in FIGS. 3-10, the cable is positioned within the housing 100H formed by the frame 100F so that the cable 200 is clamped with the second cable clamp 120 such that the score 240, such as the first score 240A on the insulation 230 of the cable 200 is disposed between the cable guide 140 and the second cable clamp 120. For example, where the cable 200 includes a first score 240A and a second score 240B so that the first insulation portion 230A and the second insulation portion 230B are removed from the cable 200, the cable 200 is positioned relative to the first cable clamp 110 and the second cable clamp 120 so that the first cable clamp 110 is disposed between the first score 240A and the second score 240B. In this aspect, the portion of the cable 200 corresponding to the second insulation portion 230B is clamped by the first cable clamp 110 (FIG. 26, Block 2610). For example, the controller 190 sends commands to the first cable clamp clamping drive 171 to actuate the first cable clamp 110 where the first portion 110A and the second portion 110B move in directions 300A, 300B towards each other to grip the cable 200. As the first cable clamp 110 grips the cable 200 on the second insulation portion 230B, the first cable clamp 110 prevents separation of the second insulation portion 230B from the cable at the second score 240B while the first insulation portion 230A is removed by the second cable clamp 120. In one aspect, the portion of the cable 200 corresponding to the first insulation portion 230A is clamped by the second cable clamp 120 (FIG. 26, Block 2615). For example, the controller 190 sends commands to the second cable clamp clamping drive 172 to actuate the second cable clamp 120 where the first portion 120A and the second portion 120B move in directions 300A, 300B towards each other to grip the portion of the cable 200 corresponding to the first insulation portion 230A in preparation for the removal of the first insulation portion 230A, as illustrated in FIG. 4.

In one aspect, to remove the first insulation portion 230A from the cable 200, the controller 190 sends commands to the second cable clamp linear drive 173 to move the second cable clamp 120 in direction 500A, relative to the cable guide 140 (and relative to the first cable clamp 110), in a direction extending along the cable 200 to remove the first portion 230A of the insulation 230 clamped by the second cable clamp 120 where the first portion 230A of the insulation 230 is separated from the cable 200 at the first score 240A to expose shielding 220 of the cable 200 (FIG. 26, Block 2620). For example, movement of the second cable clamp 120 in direction 500A pulls the first insulation portion 230A in direction 500A so that the insulation 230 tears at the first score 240A thereby separating the first insulation portion 230A from the second insulation portion 230B, held by the first cable clamp 110, to expose the shielding 220 as illustrated in FIG. 5. In one aspect, as illustrated in FIG. 6, the second cable clamp 120 may pull the first insulation portion 230A completely off of the cable 200; while in another aspect, the second cable clamp 120 may pull the first insulation portion 230A partially off of the cable where the shielding 220 is exposed between the first insulation portion 230A and the second insulation portion 230B, as illustrated in FIG. 7.

In one aspect, the first cable clamp 110 and the second cable clamp 120 may operate to cut the exposed shielding 220 of the cable 200 (FIG. 26, Block 2630), where the second cable clamp 120 is moved towards the first cable clamp 110 in the direction 500A extending along the cable 200 to cut the shielding 220 to expose one or more conductors 210 of the cable 200. For example, the second cable clamp 120 may release the first insulation portion 230A where the first portion 120A and the second portion 120B move in directions 300A, 300B away from each other to release the first insulation portion 230A. The second cable clamp 120, after releasing the first insulation portion 230A moves in direction 500B so that the second cable clamp is positioned at least partially over the exposed shielding 220. When positioned at least partially over the exposed shielding 220 the second cable clamp 120 is closed, e.g., the first portion 120A and the second portion 120B move in directions 300A, 300B, to grip the shielding 220, as illustrated in FIG. 8.

The second cable clamp 120, gripping the shielding 220, moves in direction 500B towards the first cable clamp, which is also gripping (e.g. clamped) the cable 200, so that a portion 220P of the shielding 220 disposed between the first cable clamp 110 and the second cable clamp 120 is fanned as illustrated in FIG. 9B. In one aspect, fanning of the shielding 220 is where the shielding 220 is compressed axially, such as by relative movement between cable clamps 110, 120, so that the shielding 220 folds to radially expand outwardly from the one or more conductors 210. In one aspect, the first cable clamp 110 and the second cable clamp 120 form a cutting die where the first cable clamp 110 includes a punch member 700 and the second cable clamp includes a recess 710. In one aspect, each of the first portion 110A, and second portion 110B includes a punch member portion 700A, 700B and each of the first portion 120A, and second portion 120B includes a recess portion 710A, 710B. The recess portion 710 forms a cutting member 900C where a portion 220P of the shielding 220 is cut through an interface 900I of the cutting member 900C and the punch member 700. For example, the recess 710 is sized so that the punch member 700 fits within the recess where the clearance provided between an outer periphery 702 of the punch member 700 and an inside surface 710RS of the recess 710 may be such that as the punch member 700 is inserted into the recess 710, the cutting member 900C shears, tears or both shears and tears the portion 220P of the shielding 220 (e.g. fanned shielding as illustrated in FIG. 9B) that is pressed up against the punch member 700 (the cut shielding is illustrated in FIG. 9C); while as noted above, in other aspects, the clearance provided between an outer periphery 702 of the punch member 700 and the inside surface 710RS of the recess 710 may be such that as the punch member 700 is inserted into the recess 710 cutting of the shielding by the interface 900I between the punch member 700 and the cutting member 900C may occur by one or more of severing the shielding, tearing of the shielding such as by local stress concentrations, shearing the shielding or otherwise terminating the geometry of the shielding. In one aspect, after the portion 220P of the shielding 220 is cut, the ends 220FA, 220FB of the cut shielding 220 may remain fanned however, the fanned end 220FA that remains on the cable 200 may be flattened in any suitable manner such as by passage of the fanned end 220FA through the aperture 100A as the cable is removed from the cable processing apparatus 100 or by the second insulation portion 230B when the second insulation portion 230B is removed from the cable 200. In other aspects, the aperture 100A may be sized so that the fanned end 200FA remains fanned after the cable 200 is removed from the cable processing apparatus 100, such as when the second insulation portion 230B is not removed from the cable 200 or when only a single portion of insulation is removed from the cable. The portion of the shielding 220 that includes the fanned end 220FB is removed from the cable 220 through movement of the second cable clamp 120 in direction 500A and/or by removal of the cable 200 from the cable processing apparatus 100.

In one aspect, the cable 200 may be removed from the cable processing apparatus 100 through the cable guide 140 with one or more of the first cable clamp 110 and the second cable clamp 120 in an unclamped/open position; while in other aspects, the cable 200 may be removed through the cable guide 140 with one or more of the first cable clamp 110 and the second cable clamp 120 in the clamped/closed position. In one aspect, the cable 200 may be removed from the cable processing apparatus 100 with the second insulation portion 230B still connected to the cable. For example, the first cable clamp 110 may be opened (FIG. 26, Block 2640) and the one or more gripping members 142A, 142B may be opened (FIG. 26, Block 2645), while the second cable clamp 120 remains closed, e.g. so that the second cable clamp holds the cut shielding and/or the first insulation portion 230A while the cable 200 is removed in direction 500B. Opening the first cable clamp 110 releases the second insulation portion 230B so that the second insulation portion 230B moves with the cable 200 as the cable is removed from the cable processing apparatus 100 in direction 500B so that only the one or more conductors 210 are exposed (with minimal shielding extending from the second insulation portion 230B over the exposed one or more conductors 210). In one aspect, the one or more gripping members 142A, 142B may be opened while keeping the first cable clamp 110 and the second cable clamp 120 closed (in other aspects the second cable clamp 120 may be open) so that as the cable 200 is removed from the cable processing apparatus 100 the insulation 230 tears at the second score 240B separating the second insulation portion 230B, being held by the first cable clamp 110, from the cable 200 (FIG. 26, Block 2650) as illustrated in FIGS. 9A and 10 so that the one or more conductors 210 and a length of shielding 220 (e.g. corresponding to the length L of the second insulation portion 230B) of the cable 200 are exposed.

In one aspect, as illustrated in FIGS. 11-19, where the cable 200 includes single score 240 such as the first score 240A so that the first insulation portion 230A is removed from the cable 200, the cable 200 is positioned relative to the first cable clamp 110 and the second cable clamp 120 so that the first score 240A is positioned between the cable guide 140 and the first cable clamp 110 as illustrated in FIG. 11. In this aspect, the portion of the cable 200 corresponding to the first insulation portion 230A is clamped by the second cable clamp 120 (FIG. 26, Block 2615) as illustrated in FIG. 12. For example, the controller 190 sends commands to the second cable clamp clamping drive 172 to actuate the second cable clamp 120 where the first portion 120A and the second portion 120B move in directions 300A, 300B towards each other to grip the cable 200.

In one aspect, to remove the first insulation portion 230A from the cable, the controller 190 sends commands to the second cable clamp linear drive 173 to move the second cable clamp 120 in direction 500A relative to the first cable clamp 110 (FIG. 26, Block 2620) as illustrated in FIG. 13. For example, movement of the second cable clamp 120 in direction 500A pulls the first insulation portion 230A in direction 500A so that the insulation 230 tears at the first score 240A thereby separating the first insulation portion 230A from the remaining insulation 230 on the cable 200 and held by the one or more gripping members 142A, 142B of the cable guide 140, to expose the shielding 220 as illustrated in FIG. 13. In one aspect, the second cable clamp 120 may pull the first insulation portion 230A partially off of the cable where the shielding 220 is exposed between the first insulation portion 230A and the remaining insulation 230, as illustrated in FIG. 14; while in other aspects, as illustrated in FIG. 16, the second cable clamp 120 may pull the first insulation portion 230A completely off of the cable 200. The second cable clamp 120 is opened to release the first insulation portion as illustrated in FIGS. 14 and 17.

In one aspect, the first cable clamp 110 and the second cable clamp 120 may operate to cut the exposed shielding 220 of the cable 200 in a manner substantially similar to that described above. For example, sequentially after or simultaneous with the second cable clamp 120 moving in direction 500A to at least partially remove the first insulation portion 230A from the cable 200, the first cable clamp 110 is closed (e.g. the first portion 110A and the second portion 110B move towards each other in directions 300A, 300B) to grip the exposed shielding 220 (FIG. 26, Block 2625). The second cable clamp 220 may release the first insulation portion 230A where the first portion 120A and the second portion 120B move in directions 300A, 300B away from each other to release the first insulation portion 230A. The second cable clamp 120, after releasing the first insulation portion 230A moves in direction 500B so that the second cable clamp is positioned at least partially over the exposed shielding 220. When positioned at least partially over the exposed shielding 220 the second cable clamp 120 is closed, e.g., the first portion 120A and the second portion 120B move in directions 300A, 300B, to grip the shielding 220, as illustrated in FIGS. 15 and 18. The second cable clamp 120, gripping the shielding 220, moves in direction 500B towards the first cable clamp 110, which is also gripping the shielding 220, so that a portion 220P of the shielding 220 disposed between the first cable clamp 110 and the second cable clamp 120 is fanned as illustrated in FIG. 9B where movement of the second cable clamp 120 towards the first cable clamp 110 cuts the portion 220P of the shielding 220 (FIG. 26, Block 2630) as described above.

In one aspect, the cable 200 may be removed from the cable processing apparatus 100 by opening the one or more gripping members 142A, 142B and at least the first cable clamp 110 and pulling the cable 200 from the cable processing apparatus 100 in the direction 500B (FIG. 26, Block 2635). In one with the cable may be removed from the cable processing apparatus 100 without cutting the shielding 220.

In one aspect, operation of the cable processing apparatus 100 where the first cable clamp 110 and the second cable clamp 120 each comprise the respective unitary member 110M, 120M is substantially similar to that described above. For example, referring to FIGS. 1B, 20-26, an exemplary operation of the cable processing apparatus 100 will be described. As noted above, the cable processing apparatus 100 includes the controller 190 that controls the operation of the drive system 170. The controller 190 may be any suitable controller such as a programmable logic controller, a series of solenoids, and/or a computer processor including non-transitory computer program code configured to effect operation of the cable processing apparatus 100 as described herein. The controller 190 may include any suitable operator interface 191 that includes any suitable controls 191A, 191B, 191C, each of which may correspond to a particular operation of the cable processing apparatus 100. For example, control 191A may correspond to closing the gripping members 142A, 142B of the cable guide 140, control 191B may correspond to cable preparation in which a single portion of insulation 230, such as the first insulation portion 230A is removed from the cable 200, and control 191C may correspond to cable preparation in which two portions of insulation 230, such as the first insulation portion 230A and the second insulation portion 230B are removed from the cable 200. In other aspects, the controls 191A-191C may correspond to any suitable portions of the cable preparation process (e.g. insulation removal and/or shield cutting) performed by the cable processing apparatus 100 so that some or all of the processing operations described herein are performed.

In this aspect, the first cable clamp may include a cable guide 140A that is, in one aspect, supplemental to the cable guide 140, such as where the cable includes the first insulation portion 230A and the second insulation portion 230B that are to be removed from the cable 200. Here, the one or more gripping members 142A, 142B of the cable guide 140 may be used in conjunction with the gripping members 110GA, 110GB, 120GA, 120GB (which are movably disposed within the respective unitary member 110M, 120M) in a manner substantially similar to that described above with respect to FIGS. 3-10, where instead of the first portions 110A, 120A and second portions 110B, 120B of the first cable clamp 110 and second cable clamp 120 moving in one or more of directions 300A, 300B, in this aspect, the gripping members 110GA, 110GB, 120GA, 120GB move in one or more of directions 300A, 300B to grip and release the cable 200 as described above. Similarly, in one aspect, the cable guide 140A may also be supplement to the cable guide 140 such as where the cable includes only the first insulation portion 230A to be removed from the cable 200. Here, the one or more gripping members 142A, 142B of the cable guide 140 may be used in conjunction with the gripping members 110GA, 110GB, 120GA, 120GB (which are movably disposed within the respective unitary member 110M, 120M) in a manner substantially similar to that described above with respect to FIGS. 11-19, where instead of the first portions 110A, 120A and second portions 110B, 120B of the first cable clamp 110 and second cable clamp 120 moving in one or more of directions 300A, 300B, in this aspect, the gripping members 110GA, 110GB, 120GA, 120GB move in one or more of directions 300A, 300B to grip and release the cable 200 as described above. In another aspect, where the cable guide 140 is employed the first cable clamp 110 may not include the cable guide 140A.

In one aspect, where the cable guide 140 is not used (the cable guide 140 may be provided on the cable processing apparatus 100 but its use may not be prescribed by the controller 190 in certain instances such as where only the first insulation portion 230A is to be removed from the cable 200) the first score 240A may be placed, upon insertion of the cable 200 into the housing 100H, between the first cable clamp 110 and the second cable clamp 120 in a manner substantially similar to that described above with respect to the second score 240B. For example, the cable 200 is inserted into the housing through at least the cable guide 140A (FIG. 26, Block 2600) so that the end 200E of the cable is positioned in any suitable manner, such as with the cable stop 105 so that the first score 240A is disposed between the first cable clamp 110 and the second cable clamp 120. The first cable clamp 110 may be actuated by the controller 190, in a manner similar to that described above, so that the first cable clamp 110 grips the cable 200 (FIG. 26, Block 2610). Sequentially to or simultaneously with, clamping of the first cable clamp 110, the second cable clamp is actuated by the controller 190, in a manner similar to that described above, so that the second cable clamp 120 grips the first insulation portion 230A (FIG. 26, Block 2615). As noted above, in this aspect, the first cable clamp 110 and the second cable clamp 120 each include the respective unitary member 110M, 120M in which the respective gripping members 110GA, 110GB, 120GA, 120GB are disposed. Rather than moving the first portions 110A, 120A and second portions 110B, 120B of the first cable clamp 110 and the second cable clamp 120 as described above, the drive system 170 moves each of the gripping members 110GA, 110GB, 120GA, 120GB relative to the respective unitary member 110M, 120M (and towards and away from each other) in directions 300A, 300B for gripping and releasing the cable 200.

In a manner similar to that described above, to remove the first portion of insulation 230A the second cable clamp 120 is moved in direction 500A, as illustrated in FIG. 22) to pull the first insulation portion 230A at least partially off of the cable 200 (FIG. 26, Block 2620). Also in a manner described above, the shielding 220 of the cable may be cut using the first cable clamp 110 and the second cable clamp 120 (FIG. 26. Block 2630). For example, as described above, the gripping members 120GA, 120GB of the second cable clamp 120 are moved in directions 300A, 300B so as to release the first insulation portion 230A. The second cable clamp 120 is repositioned in direction 500B and the gripping members 120GA, 120GB are moved in directions 300A, 300B to grip the shielding 220 of the cable 200 (as illustrated in FIG. 23). In a manner substantially similar to that described above, the second cable clamp 120 is moved in direction 500A towards the first cable clamp 110 where movement of the second cable clamp 120 in direction 500A, while the shielding 220 is clamped by the second cable clamp, causes the portion 220P of the shielding 220 to fan and further movement of the second cable clamp 120 against the first cable clamp 110 causes engagement of the cutting member 900C and the punch member 700 to cut the shielding 220 (as illustrated in FIG. 24). In one aspect, the first cable clamp 110 is opened (FIG. 26, Block 2640) where the gripping members 110GA, 110GB are moved in directions 300A, 300B away from each other to release the cable 200 so that the cable 200 can be pulled in direction 500A for removing the cable 200 from the cable processing apparatus 100. In one aspect, where the cable guide 140 is provided, the one or more gripping members 142A, 142B may also be opened (e.g. moved away from each other in directions 300A, 300B) (FIG. 26, Block 2645) to release the cable 200 for removal from the cable processing apparatus 100 as described above. In one aspect, the second cable clamp 120 may remain closed during removal of the cable 200 so that the cut portion of the shielding 220 is retained within the cable processing apparatus to expose the one or more conductors 210 and for disposal of the cut portion of the shielding 220 in the waste bin 150; while in other aspects the second cable clamp 120 may be opened for removal of the cable 20 so that the cut portion of the shielding 220 remains over the one or more conductors 210.

As described above, the controller 190 is configured, e.g. with any suitable logic, valve sequencing, programming, etc., to control movement of the cable guide 140, the first cable clamp 110 and the second cable clamp 120 based on operator input through the operator interface 191. For example, in the exemplary operations of the cable processing apparatus 100 described above, the controller 190 is configured to move the second cable clamp 120 to a clamped position such that the cable 200 extending through the cable guide 140 into the frame 100F is clamped by the second cable clamp 120, where a first score 230A in the insulation 230 of the cable 200 is disposed between the cable guide 140 and the second cable clamp 120. The controller is also configured to move the second cable clamp 120, relative to the cable guide 140 and the first cable clamp 110, in a direction 500B extending along the cable such that the first portion 230A of the insulation 230 clamped by the second cable clamp 120 is removed (or at least partially removed) from the cable 200 at the first score 230A to expose the shielding 220 of the cable 200. The controller is further configured to move the second cable clamp 120, relative to the first cable clamp 110, in the direction 500A extending along the cable 200 to cut the shielding 220 to expose one or more conductor 210 of the cable 200. As also described above, the controller 190 is configured to control the opening and closing of the cable guide 140 gripping members 142A, 142, the first cable clamp 110 and the second cable clamp 120 for gripping the cable 200 upon insertion of the cable into the frame 110F and for removal of the cable 200 from the frame with or without one or more of the second insulation portion 230B and the cut shielding 220 remaining on the cable 200.

As can be seen from the above description, the aspects of the present disclosure provide a single cable processing apparatus 100 in which a cable 200 may be processed to remove one or more insulation portions 230A, 230B of the cable insulation 230 and cutting a portion of the cable shielding 220 to expose one or more conductor 210 of the cable with a single operation/handling of the cable 200 by the operator. The removal of the insulation portions 230A, 230B and the cutting of the shielding 220 are processes that occur automatically and are contained within a common housing 100H formed by the frame 100F of the cable processing apparatus 100 such that each of the cables 200 processed by the cable processing apparatus are of substantially the same quality (i.e. operator induced variations in the cable are not present due to differences in the manner different operators would cut the shielding 220 and remove the insulation 230).

The following are provided in accordance with the aspects of the present disclosure:

A1. A cable processing apparatus comprising:
a frame;
a cable guide coupled to the frame;
a first cable clamp coupled to the frame adjacent the cable guide;
a second cable clamp coupled to the frame adjacent the cable guide such that the first cable clamp is disposed between the cable guide and the second cable clamp; and
a controller coupled to the first cable clamp and the second cable clamp, the controller being configured to
move the second cable clamp to a clamped position such that a cable extending through the cable guide into the frame is clamped by the second cable clamp, where a first score in an insulation of the cable is disposed between the cable guide and the second cable clamp,
move the second cable clamp, relative to the cable guide, in a direction extending along the cable such that a first portion of the insulation clamped by the second cable clamp is removed from the cable at the first score to expose shielding of the cable, and
move the second cable clamp, relative to the first cable clamp, in the direction extending along the cable to cut the shielding to expose one or more conductor of the cable.

A2. The cable processing apparatus of paragraph A1, wherein the controller is further configured to move the first cable clamp to a clamped position such that a cable inserted through the cable guide is clamped by the first cable clamp.

A3. The cable processing apparatus of paragraph A2, wherein the first cable clamp, in a clamped position, interfaces with the second cable clamp to form a cutting member configured to cut the shielding.

A4. The cable processing apparatus of paragraph A1, wherein the cable is removed through the cable guide with one or more of the first cable clamp and the second cable clamp in an unclamped position.

A5. The cable processing apparatus of paragraph A1, wherein the cable is removed through the cable guide with one or more of the first cable clamp and the second cable clamp in the clamped position.

A6. The cable processing apparatus of paragraph A1, wherein a second score is disposed on the insulation between the cable guide and the first score to define a second portion of the insulation, the first cable clamp being disposed between the first score and the second score and configured to hold the second portion of the insulation on the cable during removal of the first portion of the insulation.

A7. The cable processing apparatus of paragraph A6, wherein the cable remains clamped by the first cable clamp during movement of the second cable clamp.

A8. The cable processing apparatus of paragraph A6, wherein the controller is further configured to move the first cable clamp to an unclamped position such that the cable is released for removal from the cable processing apparatus through the cable guide.

A9. The cable processing apparatus of paragraph A6, wherein the first cable clamp is configured to hold the second portion of the insulation as the cable is removed through the cable guide such that the second portion of the insulation is separated at the second score to expose a predetermined length of the shielding of the cable.

A10. The cable processing apparatus of paragraph A1, wherein the cable guide includes gripping members configured to grip the cable.

A11. The cable processing apparatus of paragraph A10, wherein the controller is configured to actuate the gripping members to grip and release the cable.

A12. The cable processing apparatus of paragraph A1, wherein the frame forms a housing, the first cable clamp and the second cable clamp are disposed within a common chamber within the housing.

A13. The cable processing apparatus of paragraph A1, further comprising a drive section coupled to the controller, the drive section being configured to move one or more or more of the first cable clamp and the second cable clamp based on command signals from the controller.

A14. The cable processing apparatus of paragraph A1, wherein cable passage apertures of the cable guide, the first cable clamp and the second cable clamp are arranged relative to each other so as to have a common axis along which the cable extends.

A15. The cable processing apparatus of paragraph A1, wherein the first cable clamp includes a cable passage aperture and one or more protrusion extending radially inward relative to a center of the cable passage aperture.

A16. The cable processing apparatus of paragraph A15, wherein the one or more protrusions are configured to concentrate a gripping stress of the first cable clamp adjacent the first score in the insulation of the cable.

A17. The cable processing apparatus of paragraph A15, wherein the one or more protrusions are configured to penetrate a predetermined distance into the insulation or elastically deform the insulation.

A18. The cable processing apparatus of paragraph A15, wherein the one or more protrusions are configured to apply a pressure gradient to the insulation of the cable, where the pressure gradient decreases further away from the first score.

A19. The cable processing apparatus of paragraph A1, wherein the second cable clamp includes a cable passage aperture and one or more protrusion extending radially inward relative to a center of the cable passage aperture.

A20. The cable processing apparatus of paragraph A19, wherein the one or more protrusions are configured to concentrate a gripping stress of the second cable clamp adjacent the first score in the insulation of the cable.

A21. The cable processing apparatus of paragraph A19, wherein the one or more protrusions are configured to penetrate a predetermined distance into the insulation or elastically deform the insulation.

A22. The cable processing apparatus of paragraph A19, wherein the one or more protrusions are configured to apply a pressure gradient to the insulation of the cable, where the pressure gradient decreases further away from the first score.

A23. The cable processing apparatus of paragraph A1, wherein the first cable clamp comprises a first portion and a second portion that are movable relative to each other to grip and release the cable.

A24. The cable processing apparatus of paragraph A1, wherein the second cable clamp comprises a first portion and a second portion that are movable relative to each other to grip and release the cable.

A25. The cable processing apparatus of paragraph A1, wherein the first cable clamp comprises:
a unitary member defining a cable passage aperture through which the cable passes; and
at least two gripping members movably coupled to the unitary member so as to extend into and retract from the cable passage aperture to grip and release the cable.

A26. The cable processing apparatus of paragraph A1, wherein the second cable clamp comprises:
a unitary member defining a cable passage aperture through which the cable passes; and
at least two gripping members movably coupled to the unitary member so as to extend into and retract from the cable passage aperture to grip and release the cable.

A27. The cable processing apparatus of paragraph A1, wherein each of the first cable clamp and the second cable clamp comprise one or more resilient member configured to engage the cable, wherein the one or more resilient member deforms around the cable to grip the cable.

B1. A cable processing apparatus comprising:
a frame;
a cable guide coupled to the frame, the cable guide including gripping members configured to grip a cable extending through the cable guide into the frame;
a first cable clamp coupled to the frame adjacent the cable guide;
a second cable clamp coupled to the frame adjacent the cable guide such that the first cable clamp is disposed between the cable guide and the second cable clamp; and
a controller coupled to the first cable clamp and the second cable clamp, the controller being configured to
move the gripping members of the cable guide to grip the cable,
move the second cable clamp to a clamped position such that the cable is clamped by the second cable clamp, where a first score in an insulation of the cable is disposed between the cable guide and the second cable clamp,
move the second cable clamp, relative to the cable guide, in a direction extending along the cable such that a first portion of the insulation clamped by the second cable clamp is removed from the cable at the first score to expose shielding of the cable,
move the second cable clamp, relative to the first cable clamp, in the direction extending along the cable to cut the shielding to expose one or more conductor of the cable, and
move the gripping members of the cable guide to release the cable.

B2. The cable processing apparatus of paragraph B1, wherein the controller is further configured to move the first cable clamp to a clamped position such that a cable inserted through the cable guide is clamped by the first cable clamp.

B3. The cable processing apparatus of paragraph B2, wherein the first cable clamp, in a clamped position, interfaces with the second cable clamp to form a cutting member configured to cut the shielding.

B4. The cable processing apparatus of paragraph B1, wherein the cable is removed through the cable guide with one or more of the first cable clamp and the second cable clamp in an unclamped position.

B5. The cable processing apparatus of paragraph B1, wherein the cable is removed through the cable guide with one or more of the first cable clamp and the second cable clamp in the clamped position.

B6. The cable processing apparatus of paragraph B1, wherein a second score is disposed on the insulation between the cable guide and the first score to define a second portion of the insulation, the first cable clamp being disposed between the first score and the second score and configured to hold the second portion of the insulation on the cable during removal of the first portion of the insulation.

B7. The cable processing apparatus of paragraph B6, wherein the cable remains clamped by the first cable clamp during movement of the second cable clamp.

B8. The cable processing apparatus of paragraph B6, wherein the controller is further configured to move the first cable clamp to an unclamped position such that the cable is released for removal from the cable processing apparatus through the cable guide.

B9. The cable processing apparatus of paragraph B6, wherein the first cable clamp is configured to hold the second portion of the insulation as the cable is removed through the cable guide such that the second portion of the insulation is separated at the second score to expose a predetermined length of the shielding of the cable.

B10. The cable processing apparatus of paragraph B1, wherein the frame forms a housing, the first cable clamp and the second cable clamp are disposed within a common chamber within the housing.

B11. The cable processing apparatus of paragraph B1, wherein cable passage apertures of the cable guide, the first cable clamp and the second cable clamp are arranged relative to each other so as to have a common axis along which the cable extends.

B12. The cable processing apparatus of paragraph B1, wherein the first cable clamp includes a cable passage aperture and one or more protrusion extending radially inward relative to a center of the cable passage aperture.

B13. The cable processing apparatus of paragraph B12, wherein the one or more protrusions are configured to concentrate a gripping stress of the first cable clamp adjacent the first score in the insulation of the cable.

B14. The cable processing apparatus of paragraph B12, wherein the one or more protrusions are configured to penetrate a predetermined distance into the insulation or elastically deform the insulation.

B15. The cable processing apparatus of paragraph B12, wherein the one or more protrusions are configured to apply a pressure gradient to the insulation of the cable, where the pressure gradient decreases further away from the first score.

B16. The cable processing apparatus of paragraph B1, wherein the second cable clamp includes a cable passage aperture and one or more protrusion extending radially inward relative to a center of the cable passage aperture.

B17. The cable processing apparatus of paragraph B16, wherein the one or more protrusions are configured to concentrate a gripping stress of the second cable clamp adjacent the first score in the insulation of the cable.

B18. The cable processing apparatus of paragraph B16, wherein the one or more protrusions are configured to penetrate a predetermined distance into the insulation or elastically deform the insulation.

B19. The cable processing apparatus of paragraph B16, wherein the one or more protrusions are configured to apply a pressure gradient to the insulation of the cable, where the pressure gradient decreases further away from the first score.

B20. The cable processing apparatus of paragraph B1, wherein the first cable clamp comprises a first portion and a second portion that are movable relative to each other to grip and release the cable.

B21. The cable processing apparatus of paragraph B1, wherein the second cable clamp comprises a first portion and a second portion that are movable relative to each other to grip and release the cable.

B22. The cable processing apparatus of paragraph B1, wherein the first cable clamp comprises:

a unitary member defining a cable passage aperture through which the cable passes; and at least two gripping members movably coupled to the unitary member so as to extend into and retract from the cable passage aperture to grip and release the cable.

B23. The cable processing apparatus of paragraph B1, wherein the second cable clamp comprises:

a unitary member defining a cable passage aperture through which the cable passes; and at least two gripping members movably coupled to the unitary member so as to extend into and retract from the cable passage aperture to grip and release the cable.

B24. The cable processing apparatus of paragraph B1, wherein each of the first cable clamp and the second cable clamp comprise one or more resilient member configured to engage the cable, wherein the one or more resilient member deforms around the cable to grip the cable.

C1. A method for processing a cable:

inserting a cable through a cable guide so that the cable extends into a housing formed by a frame, where a first cable clamp and a second cable clamp for disposed within a common chamber of the frame;

clamping the cable with the second cable clamp such that a first score on an insulation of the cable is disposed between the cable guide and the second cable clamp;

moving the second cable clamp, relative to the cable guide, in a direction extending along the cable to remove a first portion of the insulation clamped by the second cable clamp where the first portion of the insulation is separated from the cable at the first score to expose shielding of the cable; and moving the second cable clamp towards the first cable clamp in the direction extending along the cable to cut the shielding to expose one or more conductor of the cable.

C2. The method of paragraph C1, further comprising moving the first cable clamp to a clamped position such that the cable inserted through the cable guide is clamped by the first cable clamp.

C3. The method of paragraph C2, wherein an interface between the first cable clamp and the second cable clamp cuts the shielding.

C4. The method of paragraph C1, further comprising removing the cable through the cable guide with one or more of the first cable clamp and the second cable clamp in an unclamped position.

C5. The method of paragraph C1, further comprising removing the cable through the cable guide with one or more of the first cable clamp and the second cable clamp in the clamped position.

C6. The method of paragraph C1, further comprising:

positioning a second score disposed on the insulation between the cable guide and the first score to define a second portion of the insulation such that the first cable clamp is disposed between the first score and the second score; and holding the second portion of the insulation on the cable with the first cable clamp during removal of the first portion of the insulation.

C7. The method of paragraph C6, wherein the cable remains clamped by the first cable clamp during movement of the second cable clamp.

C8. The method of paragraph C6, further comprising moving the first cable clamp to an unclamped position such that the cable is released for removal from the cable processing apparatus through the cable guide.

C9. The method of paragraph C6, further comprising holding the second portion of the insulation with the first cable clamp as the cable is removed through the cable guide such that the second portion of the insulation is separated at the second score to expose a predetermined length of the shielding of the cable.

C10. The method of paragraph C1, further comprising gripping the cable with gripping members of the cable guide.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 26, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 26 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or, e.g., a "third" or higher-numbered item.

Reference herein to "one example" means that one or more feature, structure, or characteristic described in connection with the example is included in one or more implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:
1. A cable processing apparatus comprising:
a frame;
a cable guide coupled to the frame;
a first cable clamp coupled to the frame adjacent the cable guide, the first cable clamp comprises a first portion and a second portion that are movable relative to each other to grip and release the cable;
a second cable clamp coupled to the frame adjacent the cable guide such that the first cable clamp is disposed between the cable guide and the second cable clamp; and
a controller coupled to the first cable clamp and the second cable clamp, the controller being configured to
move the second cable clamp to a clamped position such that a cable extending through the cable guide into the frame is clamped by the second cable clamp, where a first score in an insulation of the cable is disposed between the cable guide and the second cable clamp,
move the second cable clamp, relative to the cable guide, in a direction extending along the cable such that a first portion of the insulation clamped by the second cable clamp is removed from the cable at the first score to expose shielding of the cable, and
move the second cable clamp, relative to the first cable clamp, in the direction extending along the cable to cut the shielding to expose one or more conductor of the cable, where the first portion and the second portion of the first cable clamp, in a clamped position, interface with the second cable clamp to form a cutting member configured to cut the shielding.

2. The cable processing apparatus of claim 1, wherein the controller is further configured to move the first cable clamp to a clamped position such that the cable inserted through the cable guide is clamped by the first cable clamp.

3. The cable processing apparatus of claim 1, wherein a second score is disposed on the insulation between the cable guide and the first score to define a second portion of the insulation, the first cable clamp being disposed between the first score and the second score and configured to hold the second portion of the insulation on the cable during removal of the first portion of the insulation.

4. The cable processing apparatus of claim 3, wherein the controller is further configured to move the first cable clamp to an unclamped position such that the cable is released for removal from the cable processing apparatus through the cable guide.

5. The cable processing apparatus of claim 3, wherein the first cable clamp is configured to hold the second portion of the insulation as the cable is removed through the cable guide such that the second portion of the insulation is separated at the second score to expose a predetermined length of the shielding of the cable.

6. The cable processing apparatus of claim 1, wherein the frame forms a housing, the first cable clamp and the second cable clamp are disposed within a common chamber within the housing.

7. The cable processing apparatus of claim 1, wherein cable passage apertures of the cable guide, the first cable clamp and the second cable clamp are arranged relative to each other so as to have a common axis along which the cable extends.

8. The cable processing apparatus of claim 1, wherein the second cable clamp comprises a first portion and a second portion that are movable relative to each other to grip and release the cable.

9. The cable processing apparatus of claim 1, wherein the second cable clamp comprises:
a unitary member defining a cable passage aperture through which the cable passes; and
at least two gripping members movably coupled to the unitary member so as to extend into and retract from the cable passage aperture to grip and release the cable.

10. A method for processing a cable using the cable processing apparatus of claim 1, the method comprising:
inserting a cable through the cable guide so that the cable extends into a housing formed by the frame, where the first cable clamp and the second cable clamp are disposed within a common chamber of the frame;
clamping the cable with the second cable clamp such that the first score on the insulation of the cable is disposed between the cable guide and the second cable clamp;
moving the second cable clamp, relative to the cable guide, in the direction extending along the cable to remove the first portion of the insulation clamped by the second cable clamp where the first portion of the insulation is separated from the cable at the first score to expose shielding of the cable; and
moving the second cable clamp towards the first cable clamp in the direction extending along the cable to cut the shielding to expose the one or more conductor of the cable.

11. The method of claim 10, further comprising removing the cable through the cable guide with one or more of the first cable clamp and the second cable clamp in an unclamped position.

12. The method of claim 10, further comprising removing the cable through the cable guide with one or more of the first cable clamp and the second cable clamp in the clamped position.

13. The method of claim 10, further comprising:
positioning a second score disposed on the insulation between the cable guide and the first score to define a second portion of the insulation such that the first cable clamp is disposed between the first score and the second score; and
holding the second portion of the insulation on the cable with the first cable clamp during removal of the first portion of the insulation.

14. The method of claim 10, further comprising gripping the cable with gripping members of the cable guide.

15. The cable processing apparatus of claim 1, wherein the first cable clamp includes a cable passage aperture and one or more protrusion extending radially inward relative to a center of the cable passage aperture.

16. The cable processing apparatus of claim 15, wherein the one or more protrusions are configured to apply a pressure gradient to the insulation of the cable, where the pressure gradient decreases further away from the first score.

17. A cable processing apparatus comprising:
a frame;
a cable guide coupled to the frame;
a first cable clamp coupled to the frame adjacent the cable guide, the first cable clamp comprises:
a unitary member defining a cable passage aperture through which the cable passes, and at least two gripping members movably coupled to the unitary member so as to extend through a wall of the cable passage into an interior of the cable passage aperture and retract from the interior of the cable passage aperture to grip and release the cable;
a second cable clamp coupled to the frame adjacent the cable guide such that the first cable clamp is disposed between the cable guide and the second cable clamp; and
a controller coupled to the first cable clamp and the second cable clamp, the controller being configured to move the second cable clamp to a clamped position such that a cable extending through the cable guide into the frame is clamped by the second cable clamp, where a first score in an insulation of the cable is disposed between the cable guide and the second cable clamp, move the second cable clamp, relative to the cable guide, in a direction extending along the cable such that a first portion of the insulation clamped by the second cable clamp is removed from the cable at the first score to expose shielding of the cable, and move the second cable clamp, relative to the first cable clamp, in the direction extending along the cable to cut the shielding to expose one or more conductor of the cable.

18. The cable processing apparatus of claim 17, wherein the second cable clamp comprises:

a unitary member defining a cable passage aperture through which the cable passes; and at least two gripping members movably coupled to the unitary member so as to extend into and retract from the cable passage aperture to grip and release the cable.

19. The cable processing apparatus of claim 17, wherein a second score is disposed on the insulation between the cable guide and the first score to define a second portion of the insulation, the first cable clamp being disposed between the first score and the second score and configured to hold the second portion of the insulation on the cable during removal of the first portion of the insulation.

20. The cable processing apparatus of claim 19, wherein the first cable clamp is configured to hold the second portion of the insulation as the cable is removed through the cable guide such that the second portion of the insulation is separated at the second score to expose a predetermined length of the shielding of the cable.

* * * * *